(12) United States Patent
Abotabl et al.

(10) Patent No.: US 12,022,452 B2
(45) Date of Patent: *Jun. 25, 2024

(54) CONFIGURATION OF FREQUENCY BANDS FOR FULL-DUPLEX SLOTS

(71) Applicant: QUALCOMM Incorporated, San Diego, CA (US)

(72) Inventors: Ahmed Attia Abotabl, San Diego, CA (US); Wanshi Chen, San Diego, CA (US); Muhammad Sayed Khairy Abdelghaffar, San Jose, CA (US); Huilin Xu, Temecula, CA (US); Shimman Arvind Patel, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,812

(22) Filed: Apr. 3, 2023

(65) Prior Publication Data
US 2023/0247611 A1 Aug. 3, 2023

Related U.S. Application Data

(63) Continuation of application No. 17/210,462, filed on Mar. 23, 2021, now Pat. No. 11,622,351.
(Continued)

(51) Int. Cl.
*H04W 72/04* (2023.01)
*H04L 5/14* (2006.01)
*H04W 72/0453* (2023.01)

(52) U.S. Cl.
CPC .......... *H04W 72/0453* (2013.01); *H04L 5/14* (2013.01)

(58) Field of Classification Search
CPC .............................. H04W 72/0453; H04L 5/14
See application file for complete search history.

(56) References Cited

U.S. PATENT DOCUMENTS

| 11,622,351 B2* | 4/2023 | Abotabl | ............ | H04W 72/0453 |
| | | | | 370/277 |
| 2013/0223294 A1 | 8/2013 | Karjalainen et al. | | |

(Continued)

FOREIGN PATENT DOCUMENTS

| CN | 109819523 A | 5/2019 |
| WO | WO2010002100 A2 | 1/2010 |
| WO | WO2020146512 | 7/2020 |

OTHER PUBLICATIONS

International Search Report and Written Opinion—PCT/US2021/023830—ISA/EPO—dated Jun. 23, 2021.

*Primary Examiner* — Brenda H Pham
(74) *Attorney, Agent, or Firm* — Holland & Hart LLP

(57) ABSTRACT

Methods, systems, and devices for wireless communications are described. A frequency band configuration for a full-duplex slot may be indicated, where a frequency band configuration may include one or more downlink frequency bands and one or more uplink frequency bands. In some cases, a frequency band configuration may also include one or more guard bands. A user equipment (UE) may determine the frequency band configuration for a full-duplex slot based on a frequency configuration indication, which may include an index for a table of frequency band configurations, one or more bitmaps, or respective start and length indications for each frequency band. A frequency band configuration may apply to one slot or to multiple slots.

30 Claims, 22 Drawing Sheets

Related U.S. Application Data

(60) Provisional application No. 63/002,220, filed on Mar. 30, 2020.

(56) References Cited

U.S. PATENT DOCUMENTS

| | | |
|---|---|---|
| 2021/0307010 A1 | 9/2021 | Abotable et al. |
| 2022/0029761 A1 | 7/2022 | Su et al. |

* cited by examiner

DL Resources 305

UL Resources 310

Guard Band 315

CONFIGURATION OF FREQUENCY BANDS FOR FULL-DUPLEX SLOTS

CROSS REFERENCE

The present Application for Patent is a Continuation of U.S. patent application Ser. No. 17/210,462 by ABOTABL et al., entitled "CONFIGURATION OF FREQUENCY BANDS FOR FULL-DUPLEX SLOTS" and filed Mar. 23, 2021, which claims the benefit of U.S. Provisional Patent Application No. 63/002,220 by ABOTABL et al., entitled "CONFIGURATION OF FREQUENCY BANDS FOR FULL-DUPLEX SLOTS" and filed Mar. 30, 2020, each of which is assigned to the assignee hereof and is hereby incorporated by reference in its entirety.

FIELD OF DISCLOSURE

The present disclosure, for example, relates to wireless communications systems, more particularly to configuration of frequency bands for full-duplex slots.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. Example telecommunication standards are LTE and NR. LTE and NR are designed to improve spectral efficiency, lower costs, improve services, make use of new spectrum, and better integrate with other open standards. LTE and NR may use OFDMA on the downlink (DL), single-carrier frequency division multiple access (SC-FDMA) on the uplink (UL), and multiple-input multiple-output (MIMO) antenna technology.

In some cases, a user equipment (UE) and a base station may each support full-duplex communications (e.g., the concurrent exchange of both downlink communications and uplink communications). Examples of full-duplex communication modes may include in-band full-duplex (IBFD) and sub-band full duplex (which may alternatively be referred to as sub-band frequency division duplexing (FDD)). For an IBFD communication mode, downlink and uplink resources may fully or partially overlap in both time and frequency. For a sub-band FDD communication mode, downlink resources may be separated from uplink resources in the frequency domain (e.g., by a guard band), but may overlap in the time domain.

SUMMARY

The described techniques relate to improved methods, systems, devices, and apparatuses that support configuration of frequency bands for full-duplex slots. For example, the described techniques provide techniques for indicating uplink and downlink frequency boundaries for full-duplex slots.

A user equipment (UE) may receive a frequency configuration indication from a base station for a full-duplex slot and determine downlink frequency bands and uplink frequency bands based on the indication. In an example aspect, the frequency configuration indication may be a table-based implementation. For example, the frequency configuration indication may include an index of a table, where each entry in the table corresponds to a different frequency band configuration and specifies the frequency boundaries for all downlink bands, uplink bands, and guard bands.

In another example aspect, the frequency configuration indication may be a bitmap implementation. For example, the frequency configuration indication may include a bitmap in which each bit corresponds to a respective frequency range (e.g., each bit within the bitmap may correspond to a resource block (RB) or a resource block group (RBG) of an operating band). Bits of a first logic value (e.g., 1) within the bitmap may indicate that the respective frequency range is for downlink communications within a slot, and bits of a second logic value (e.g., 0) may indicate that the respective frequency range is for uplink communications within the slot. Boundaries between neighboring downlink and uplink bands as indicated by the bitmap may be adjusted. Guard bands may be created or inserted between the neighboring downlink and uplink bands, for example, based on the adjustments. In some aspects, the boundaries may be adjustable by a fixed amount or by different fixed amounts. In an example aspect, the UE may receive an indication (e.g., via radio resource control (RRC) signaling or control information such as downlink control information (DCI)) of whether to adjust the boundaries by reducing a downlink band as indicated by the bitmap, an uplink band as indicated by the bitmap, or any combination thereof.

In some example aspects, the frequency configuration indication may be based on multiple bitmaps, for example, for downlink and uplink bands that overlap in both time and frequency. The frequency configuration indication may include a first bitmap corresponding to a downlink frequency band and a second bitmap corresponding to an uplink frequency band. Bits of a first logic value (e.g., 1) within a bitmap (e.g., a first bitmap for the downlink frequency band, a second bitmap for the uplink frequency band) may indicate that the respective frequency range is activated ("ON") for the associated direction (e.g., downlink or uplink) within a slot. Bits of a second logic value (e.g., 0) within the bitmap may indicate that the respective frequency range is deactivated ("OFF") for the associated direction (e.g., downlink or uplink) within the slot. In some other examples, for downlink and uplink bands that overlap in both time and frequency, the frequency configuration indication may include a start frequency and length (size) indication for each band.

In additional example aspects, a frequency configuration for a full-duplex slot may apply to any subsequent full-duplex slot until a new frequency configuration is indicated to the UE. Additionally or alternatively, two or more frequency configurations for full-duplex slots may be indicated. Different frequency configurations may have different periodicities, which in some cases may ignore any half-duplex slots for counting purposes.

The techniques described herein may provide advantages such as improved indications of a frequency band configuration within full-duplex slots. The improvements to frequency band configurations may improve an efficiency, flexibility, or reliability with which frequency band configurations may be indicated for full-duplex slots, which may help conserve system, device, or spectral resources, among other benefits that may be appreciated by one or ordinary skill in the art.

A method for wireless communication is described. The method may include receiving an indication of a frequency band configuration for a slot, where the slot is for full-duplex communication, and where the indication of the frequency band configuration indicates a downlink frequency band for downlink communications within the slot and an uplink frequency band for uplink communications within the slot, receiving, within the slot, a downlink communication within the downlink frequency band, and transmitting, within the slot, an uplink communication within the uplink frequency band.

An apparatus for wireless communication is described. The apparatus may include a processor, memory coupled with the processor, and instructions stored in the memory. The instructions may be executable by the processor to cause the apparatus to receive an indication of a frequency band configuration for a slot, where the slot is for full-duplex communication, and where the indication of the frequency band configuration indicates a downlink frequency band for downlink communications within the slot and an uplink frequency band for uplink communications within the slot, receive, within the slot, a downlink communication within the downlink frequency band, and transmit, within the slot, an uplink communication within the uplink frequency band.

Another apparatus for wireless communication is described. The apparatus may include means for receiving an indication of a frequency band configuration for a slot, where the slot is for full-duplex communication, and where the indication of the frequency band configuration indicates a downlink frequency band for downlink communications within the slot and an uplink frequency band for uplink communications within the slot, means for receiving, within the slot, a downlink communication within the downlink frequency band, and means for transmitting, within the slot, an uplink communication within the uplink frequency band.

A non-transitory computer-readable medium storing code for wireless communication is described. The code may include instructions executable by a processor to receive an indication of a frequency band configuration for a slot, where the slot is for full-duplex communication, and where the indication of the frequency band configuration indicates a downlink frequency band for downlink communications within the slot and an uplink frequency band for uplink communications within the slot, receive, within the slot, a downlink communication within the downlink frequency band, and transmit, within the slot, an uplink communication within the uplink frequency band.

In some examples of the method, apparatuses, and non-transitory computer-readable medium described herein, the indication of the frequency band configuration includes an index for an entry of a table and the method, apparatuses, and non-transitory computer-readable medium may include further operations, features, means, or instructions for identifying, based on the index and the table, a lower bound for the downlink frequency band, an upper bound for the downlink frequency band, a lower bound for the uplink frequency band, and an upper bound for the uplink frequency band.

Some examples of the method, apparatuses, and non-transitory computer-readable medium described herein may further include operations, features, means, or instructions for identifying, based on the index and the table, a guard band between the downlink frequency band and the uplink frequency band. Some examples of the method, apparatuses, and non-transitory computer-readable medium described herein may further include operations, features, means, or instructions for identifying, based on the index and the table, a third frequency band for one of downlink communications or uplink communications within the slot.

In some examples of the method, apparatuses, and non-transitory computer-readable medium described herein, the index may be included in a downlink a DCI message or a medium access control control element (MAC-CE).

In some examples of the method, apparatuses, and non-transitory computer-readable medium described herein, the indication of the frequency band configuration includes a bitmap, each bit of the bitmap corresponding to a respective frequency range, the downlink frequency band may be indicated at least in part by a first set of one or more contiguous bits within the bitmap each having a first logic value, and the uplink frequency band may be indicated at least in part by a second set of one or more contiguous bits with the bitmap each having a second logic value.

Some examples of the method, apparatuses, and non-transitory computer-readable medium described herein may further include operations, features, means, or instructions for determining, based on the first set of one or more contiguous bits, a preliminary downlink frequency band, determining, based on the second set of one or more contiguous bits, a preliminary uplink frequency band, reducing, by an amount, the preliminary downlink frequency band based on adjusting a bound of the preliminary downlink frequency band that may be nearest in frequency to the preliminary uplink frequency band, determining the downlink frequency band based on reducing the preliminary downlink frequency band, reducing, by the amount, the preliminary uplink frequency band based on adjusting a bound of the preliminary uplink frequency band that may be nearest in frequency to the preliminary downlink frequency band, and determining the uplink frequency band based on reducing the preliminary uplink frequency band.

In some examples of the method, apparatuses, and non-transitory computer-readable medium described herein, a guard band between the downlink frequency band and the uplink frequency band spans a frequency range of at least double the amount.

Some examples of the method, apparatuses, and non-transitory computer-readable medium described herein may further include operations, features, means, or instructions for determining, based on the first set of one or more contiguous bits, a preliminary downlink frequency band, determining, based on the second set of one or more contiguous bits, a preliminary uplink frequency band, reducing, by an amount, the preliminary downlink frequency band or the preliminary uplink frequency band, where the reducing includes adjusting a bound of one of the preliminary downlink frequency band or the preliminary uplink frequency band, and determining the downlink frequency band or the uplink frequency band based on the reducing.

In some examples of the method, apparatuses, and non-transitory computer-readable medium described herein, a guard band between the downlink frequency band and the uplink frequency band spans a frequency range of at least the amount.

Some examples of the method, apparatuses, and non-transitory computer-readable medium described herein may further include operations, features, means, or instructions for receiving an indication of whether to reduce the preliminary downlink frequency band or reduce the preliminary uplink frequency band.

In some examples of the method, apparatuses, and non-transitory computer-readable medium described herein, the indication of the frequency band configuration includes a first bitmap for the downlink frequency band and a second bitmap for the uplink frequency band, the downlink frequency band may be indicated at least in part by a first set of one or more contiguous bits within the first bitmap each having a first logic value, and the uplink frequency band may be indicated at least in part by a second set of one or more contiguous bits within the second bitmap each having the first logic value.

In some examples of the method, apparatuses, and non-transitory computer-readable medium described herein, and the method, apparatuses, and non-transitory computer-readable medium may include further operations, features, means, or instructions for receiving an indication of a size for each of the respective frequency ranges.

In some examples of the method, apparatuses, and non-transitory computer-readable medium described herein, the indication of the frequency band configuration includes a first indication of a bound for the downlink frequency band, a second indication of a frequency range for the downlink frequency band, a third indication of a bound for the uplink frequency band, and a fourth indication of a frequency range for the uplink frequency band.

Some examples of the method, apparatuses, and non-transitory computer-readable medium described herein may further include operations, features, means, or instructions for identifying that a second slot may be for full-duplex communication, the second slot subsequent to the slot, monitoring for an indication of a second frequency band configuration for the second slot, determining, based on the monitoring and an absence of the indication of the second frequency band configuration, that the frequency band configuration for the slot may be also applicable to the second slot, receiving, within the second slot and based on the determining, a second downlink communication within the downlink frequency band, and transmitting, within the second slot and based on the determining, a second uplink communication within the uplink frequency band.

Some examples of the method, apparatuses, and non-transitory computer-readable medium described herein may further include operations, features, means, or instructions for receiving an indication of a second frequency band configuration, where the frequency band configuration may be associated with a first periodicity and the second frequency band configuration may be associated with a second periodicity, determining that the frequency band configuration may be for the slot based on the first periodicity, and determining that the second frequency band configuration may be for a second slot based on the second periodicity, the second slot subsequent to the slot.

Some examples of the method, apparatuses, and non-transitory computer-readable medium described herein may further include operations, features, means, or instructions for counting a quantity of full-duplex slots between the slot and the second slot, where the counting includes skipping a half-duplex slot between the slot and the second slot.

A method for wireless communication is described. The method may include transmitting an indication of a frequency band configuration for a slot, where the slot is for full-duplex communication, and where the indication of the frequency band configuration indicates a downlink frequency band for downlink communications within the slot and an uplink frequency band for uplink communications within the slot, transmitting, within the slot, a downlink communication within the downlink frequency band, and receiving, within the slot, an uplink communication within the uplink frequency band.

An apparatus for wireless communication is described. The apparatus may include a processor, memory coupled with the processor, and instructions stored in the memory. The instructions may be executable by the processor to cause the apparatus to transmit an indication of a frequency band configuration for a slot, where the slot is for full-duplex communication, and where the indication of the frequency band configuration indicates a downlink frequency band for downlink communications within the slot and an uplink frequency band for uplink communications within the slot, transmit, within the slot, a downlink communication within the downlink frequency band, and receive, within the slot, an uplink communication within the uplink frequency band.

Another apparatus for wireless communication is described. The apparatus may include means for transmitting an indication of a frequency band configuration for a slot, where the slot is for full-duplex communication, and where the indication of the frequency band configuration indicates a downlink frequency band for downlink communications within the slot and an uplink frequency band for uplink communications within the slot, means for transmitting, within the slot, a downlink communication within the downlink frequency band, and means for receiving, within the slot, an uplink communication within the uplink frequency band.

A non-transitory computer-readable medium storing code for wireless communication is described. The code may include instructions executable by a processor to transmit an indication of a frequency band configuration for a slot, where the slot is for full-duplex communication, and where the indication of the frequency band configuration indicates a downlink frequency band for downlink communications within the slot and an uplink frequency band for uplink communications within the slot, transmit, within the slot, a downlink communication within the downlink frequency band, and receive, within the slot, an uplink communication within the uplink frequency band.

In some examples of the method, apparatuses, and non-transitory computer-readable medium described herein, the indication of the frequency band configuration includes an index for an entry of a table, the entry corresponding to a lower bound for the downlink frequency band, an upper bound for the downlink frequency band, a lower bound for the uplink frequency band, and an upper bound for the uplink frequency band.

In some examples of the method, apparatuses, and non-transitory computer-readable medium described herein, the entry further corresponds to a guard band between the downlink frequency band and the uplink frequency band. In some examples of the method, apparatuses, and non-transitory computer-readable medium described herein, the entry further corresponds to a third frequency band for one of downlink communications or uplink communications within the slot.

In some examples of the method, apparatuses, and non-transitory computer-readable medium described herein, the index may be included in a DCI message or a MAC-CE.

In some examples of the method, apparatuses, and non-transitory computer-readable medium described herein, the indication of the frequency band configuration includes a bitmap, each bit of the bitmap corresponding to a respective frequency range, the downlink frequency band may be indicated at least in part by a first set of one or more contiguous bits within the bitmap each having a first logic value, and the uplink frequency band may be indicated at least in part by a second set of one or more contiguous bits within the bitmap each having a second logic value.

In some examples of the method, apparatuses, and non-transitory computer-readable medium described herein, the first set of one or more contiguous bits indicates a preliminary downlink frequency band, the second set of one or more contiguous bits indicates a preliminary uplink frequency band, the downlink frequency band may be narrower in frequency than the preliminary downlink frequency band by an amount, and the uplink frequency band may be narrower in frequency than the preliminary uplink frequency band by the amount.

In some examples of the method, apparatuses, and non-transitory computer-readable medium described herein, a guard band between the downlink frequency band and the uplink frequency band spans a frequency range of at least double the amount.

In some examples of the method, apparatuses, and non-transitory computer-readable medium described herein, the first set of one or more contiguous bits indicates a preliminary downlink frequency band, the second set of one or more contiguous bits indicates a preliminary uplink frequency band, and the downlink frequency band may be narrower in frequency than the preliminary downlink frequency band by an amount or the uplink frequency band may be narrower in frequency than the preliminary uplink frequency band by the amount.

In some examples of the method, apparatuses, and non-transitory computer-readable medium described herein, a guard band between the downlink frequency band and the uplink frequency band spans a frequency range of at least the amount.

Some examples of the method, apparatuses, and non-transitory computer-readable medium described herein may further include operations, features, means, or instructions for transmitting an indication of whether the downlink frequency band may be narrower in frequency than the preliminary downlink frequency band or the uplink frequency band may be narrower in frequency than the preliminary uplink frequency band.

In some examples of the method, apparatuses, and non-transitory computer-readable medium described herein, the indication of the frequency band configuration includes a first bitmap for the downlink frequency band and a second bitmap for the uplink frequency band, the downlink frequency band may be indicated at least in part by a first set of one or more contiguous bits within the first bitmap each having a first logic value, and the uplink frequency band may be indicated at least in part by a second set of one or more contiguous bits within the second bitmap each having the first logic value.

In some examples of the method, apparatuses, and non-transitory computer-readable medium described herein, and the method, apparatuses, and non-transitory computer-readable medium may include further operations, features, means, or instructions for transmitting an indication of a size for each of the respective frequency ranges.

In some examples of the method, apparatuses, and non-transitory computer-readable medium described herein, the indication of the frequency band configuration includes a first indication of a bound for the downlink frequency band, a second indication of frequency range for the downlink frequency band, a third indication of a bound for the uplink frequency band, and a fourth indication of a frequency range for the uplink frequency band.

Some examples of the method, apparatuses, and non-transitory computer-readable medium described herein may further include operations, features, means, or instructions for determining a second slot for full-duplex communication, where the second slot may be subsequent to the slot and the frequency band configuration for the slot may be also applicable to the second slot, transmitting, within the second slot, a second downlink communication within the downlink frequency band, and receiving, within the second slot, a second uplink communication within the uplink frequency band.

Some examples of the method, apparatuses, and non-transitory computer-readable medium described herein may further include operations, features, means, or instructions for transmitting an indication of a second frequency band configuration, where the frequency band configuration may be associated with a first periodicity, and the second frequency band configuration may be associated with a second periodicity.

In some examples of the method, apparatuses, and non-transitory computer-readable medium described herein, the first periodicity and the second periodicity may be exclusive of half-duplex slots.

DETAILED DESCRIPTION

Figure 1:
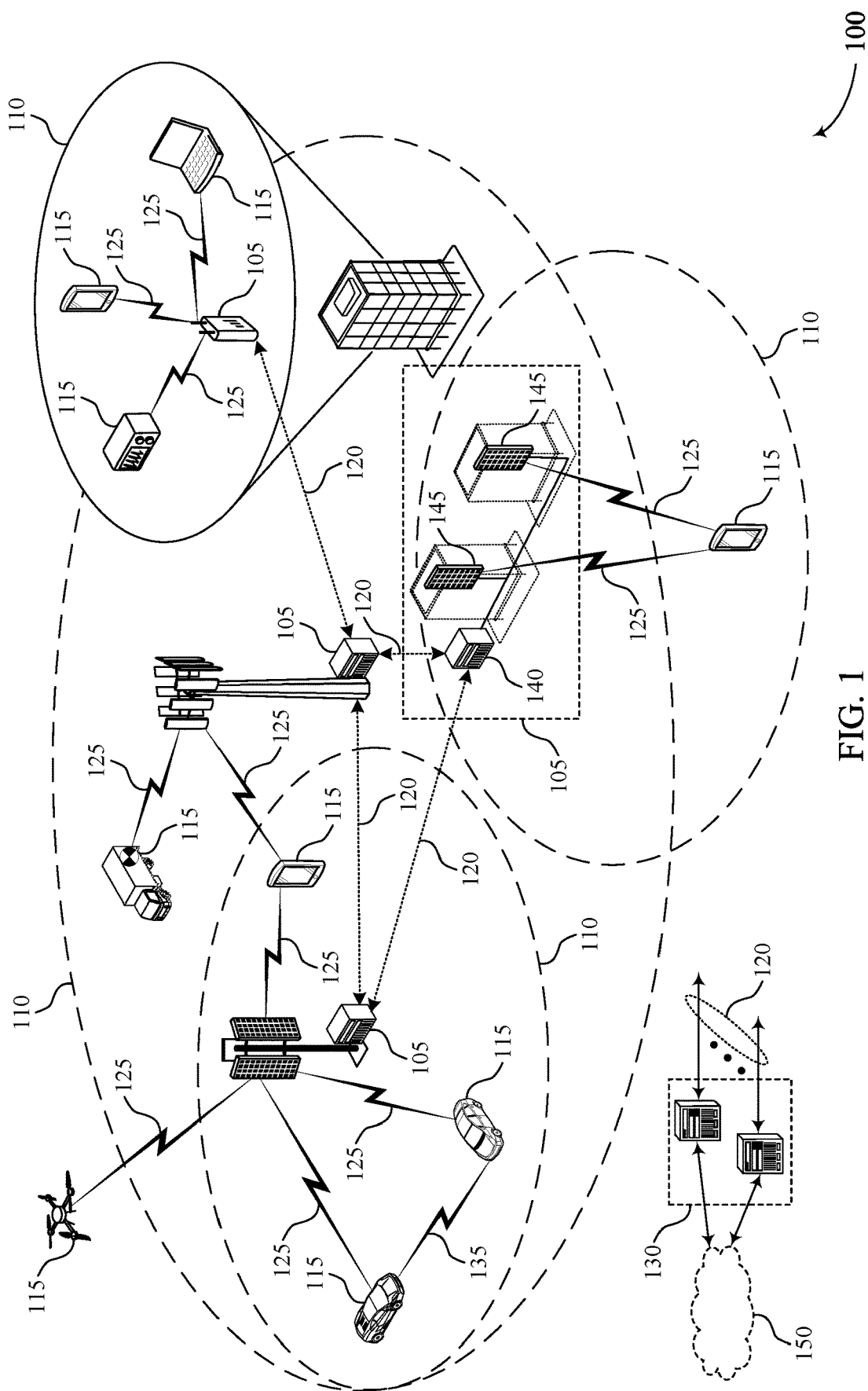
FIG. 1 illustrates an example of a system for wireless communications that supports configuration of frequency bands for full-duplex slots in accordance with aspects of the present disclosure.

In some wireless communications systems, a user equipment (UE) may receive from a base station indications of whether each symbol in a half-duplex slot is an uplink symbol, a downlink symbol, or a flexible symbol that may be either uplink or downlink. Such an indication may in some cases be referred to a slot format indication (SFI).

Where a UE supports full-duplex communications, the UE may concurrently exchange both downlink and uplink communications with a base station. Thus, for a full-duplex slot, downlink and uplink communications may both occur within any number of the symbols of a slot. As described herein, an indication may be used (e.g., transmitted from the base station to the UE) to indicate one or more frequency boundaries for different uplink and downlink frequency bands within a full-duplex slot. Such an indication may in some cases be referred to as a frequency configuration indication or as a frequency band configuration indication.

For example, a full-duplex slot may be configured (e.g., by the base station) to include any number of downlink frequency bands and also any number of uplink frequency bands, and the frequency configuration indication may specify to the UE the lower and upper frequency bounds for each downlink frequency band along with the lower and upper frequency bounds for each uplink frequency band within a full-duplex slot. The frequency configuration indication also may indicate or otherwise allow the UE to identify one or more guard bands, if any, between neighboring downlink and uplink frequency bands within the slot. Based on the frequency configuration indication, the UE may monitor for and receive one or more downlink communications within a downlink frequency band within the slot, and the UE also may transmit one or more uplink communications with an uplink frequency band within the slot.

In some cases, a frequency configuration indication may include an index for a table where each entry in the table corresponds to a respective frequency configuration and specifies the frequency boundaries for all DL, UL, and guard bands (if any) within a full-duplex slot having the respective frequency configuration. In some cases, a frequency configuration indication may include or otherwise be associated with one or more bitmaps. Each bit of a bitmap may correspond to a respective frequency range within an operating band, and the logic value of a bit may indicate whether the respective frequency range is for uplink or downlink communications, or whether the respective frequency range is ON or OFF (e.g., if the bitmap is dedicated to one direction of communications). Thus, a set of one or more contiguous bits having a same logic value may indicate a frequency band. In some cases, adjustments may be defined or indicated to introduce a guard band between adjacent frequency bands of different directions. In some cases, a frequency configuration indication may include an indication of a bound of a frequency band (e.g., a start (lowest) frequency) and of a length (e.g., a span) of one or more frequency bands for the full-duplex slot. In some cases, a frequency configuration indication may be applicable to multiple full-duplex slots (e.g., may apply to all full-duplex slots until a new frequency configuration indication is received, or may apply with a given periodicity, such as every other or every fourth full-duplex slot, for example).

A frequency configuration indication in accordance with the description herein may allow the frequency bands of a full-duplex slot to be reliably and flexibly indicated to a UE with low signaling overhead, and thus may provide reliability, flexibility, and efficiency benefits. For example, processing resources at both a base station and a UE may be conserved, along with signaling and other spectral resources, and scheduling flexibility may be enhanced, among other benefits that may be appreciated by one of ordinary skill in the art.

Aspects of the disclosure are initially described in the context of wireless communications systems. Aspects of the disclosure are further illustrated by and described with reference to apparatus diagrams, system diagrams, and flowcharts that relate to configuration of frequency bands for full-duplex slots.

FIG. 1 illustrates an example of a wireless communications system 100 that supports configuration of frequency bands for full-duplex slots in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with some bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of some radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over some carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($0f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell for example covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs) within a carrier, within a guard band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may implement frequency band configurations for slots for full-duplex communication. For example, a base station 105 may provide an indication of a frequency band configuration for a slot. The indication of the frequency band configuration may indicate at least one downlink frequency band for downlink communications within the slot and at least one uplink frequency band for uplink communications within the slot. In example aspects described herein, the indication may be a table-based implementation, a bitmap implementation, a multiple bitmap implementation, or any combination thereof (e.g., an index for a table may indicate a bitmap, where each entry of the table includes or otherwise corresponds to a respective bitmap as described herein). A UE 115 may receive the indication and identify one or more downlink frequency bands and one or more uplink frequency bands for a slot (or multiple slots) based on the indication, along with one or more guard bands in some cases. The UE 115 and the base station 105 may communicate, within the slot (or multiple slots), via downlink communications within the downlink frequency band and uplink communications within the uplink frequency band.

Figure 2:
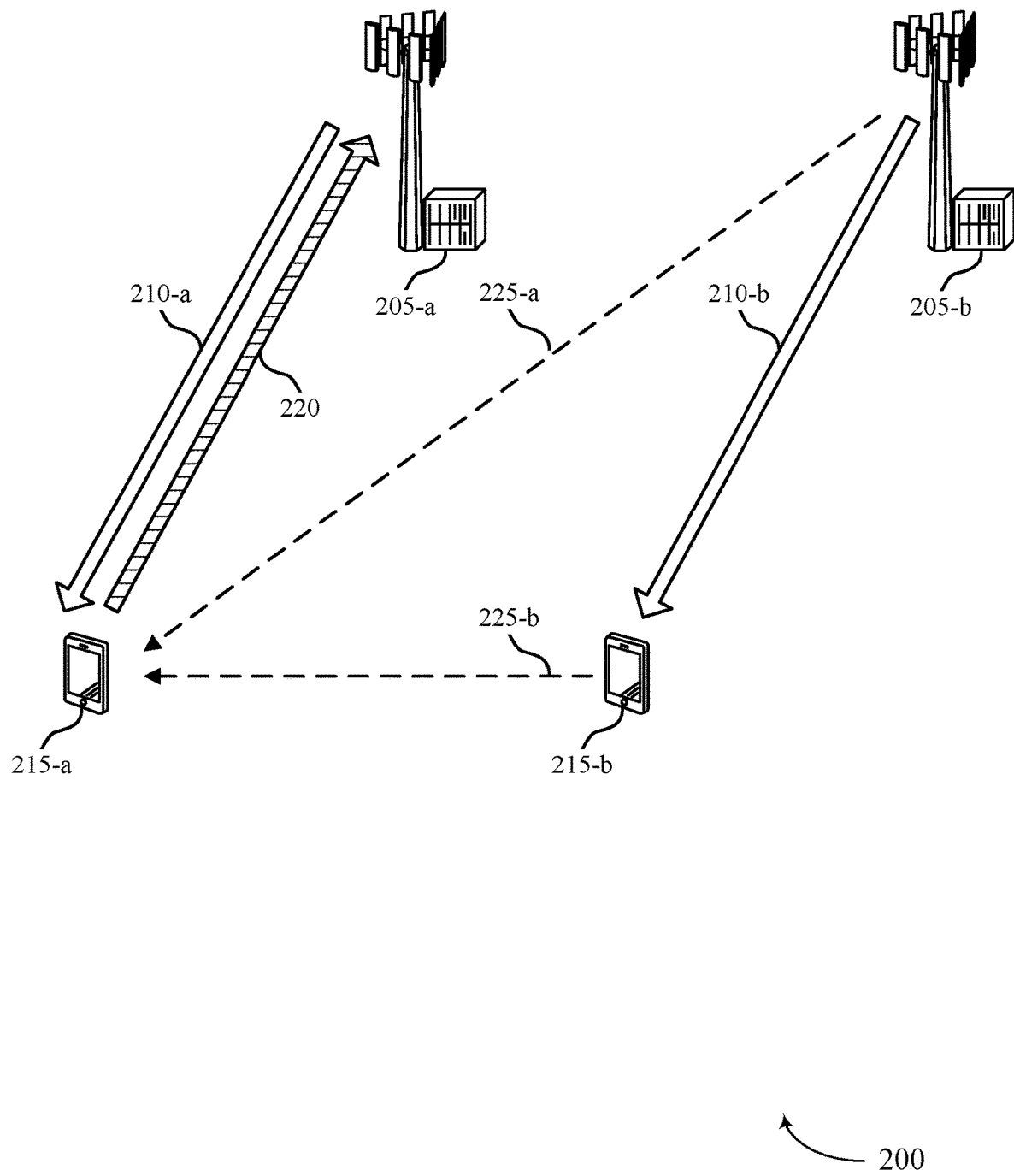
FIG. 2 illustrates an example of a wireless communications system that supports configuration of frequency bands for full-duplex slots in accordance with aspects of the present disclosure.

FIG. 2 illustrates an example of a wireless communications system 200 that supports configuration of frequency bands for full-duplex slots in accordance with various aspects of the present disclosure. In some examples, the wireless communications system 200 may implement aspects of wireless communications system 100.

Wireless communications system 200 may include UE 215-a and UE 215-b, which may each be an example of a UE 115 as described herein. Wireless communications system may also include base station 205-a and base station 205-b, which may each be an example of a base station 105 as described herein. The base stations 205-a and 205-b may provide coverage areas supportive of the communication of signals according to one or more radio access technologies (e.g., NR, LTE, or both). The coverage areas may be examples of the coverage area 110 described herein. The radio access technologies may share the same carrier frequency or at least partially overlapping frequency ranges. It is to be understood that references to the radio access technologies (e.g., NR, LTE) described herein are provided for illustrative purposes only, and different radio access technologies not specifically referred to herein may be used interchangeably with the radio access technologies described herein.

UEs 115 and base stations 105 may each be configured to communicate according to a full-duplex communication configuration (e.g., supportive of both downlink communications and uplink communications simultaneously) or a half-duplex communication configuration (e.g., supportive of downlink communications or uplink communications). In the example of FIG. 2, UE 215-a and base station 205-a may each be configured to communicate according to a full-duplex communication configuration. For example, UE 215-a and base station 205-a may each support communications including concurrent downlink transmissions 210-a and uplink data transmissions 220. Further in the example of FIG. 2, UE 215-b may be configured to communicate with base station 205-b according to a half-duplex communication configuration. For example, UE 215-b may support communications including non-simultaneous downlink transmissions 210-b and uplink data transmissions (not shown).

In some cases, UE 215-a may experience interference due to signals transmitted or received at UE 215-a. For example, UE 215-a may experience uplink-downlink interference (e.g., self-interference) between downlink transmissions 210-a and uplink transmissions 220. In some cases, UE 215-a may experience interference due to transmissions between devices different from UE 215-a. For example, UE 215-a may experience interference 225-a from base station 205-b and interference 225-b from UE 215-b due to downlink transmissions 210-b between base station 205-b to UE 215-b. The example illustrated in FIG. 2 is not limiting, and any device (e.g., UE 215-b, base station 205-a, base station 205-b) that simultaneously transmits and receives signals may experience related self-interference.

Further, full-duplex communications may occur in a dual-connectivity or other situation in which a UE 115 communicates with more than one other device. For example, UE 215-a may operate in full-duplex by receiving downlink transmissions from base station 205-b concurrent with transmitting uplink transmissions 220 to base station 205-a, regardless of whether UE 215-a also concurrently receives downlink transmissions 210-a. As another example, base station 205-a may operate in full-duplex by transmitting downlink transmissions 210-a to UE 215-a concurrent with receiving uplink transmissions (not shown) from UE 215-b, regardless of whether base station 205-a also concurrently receives uplink transmissions 220.

Figure 3A:
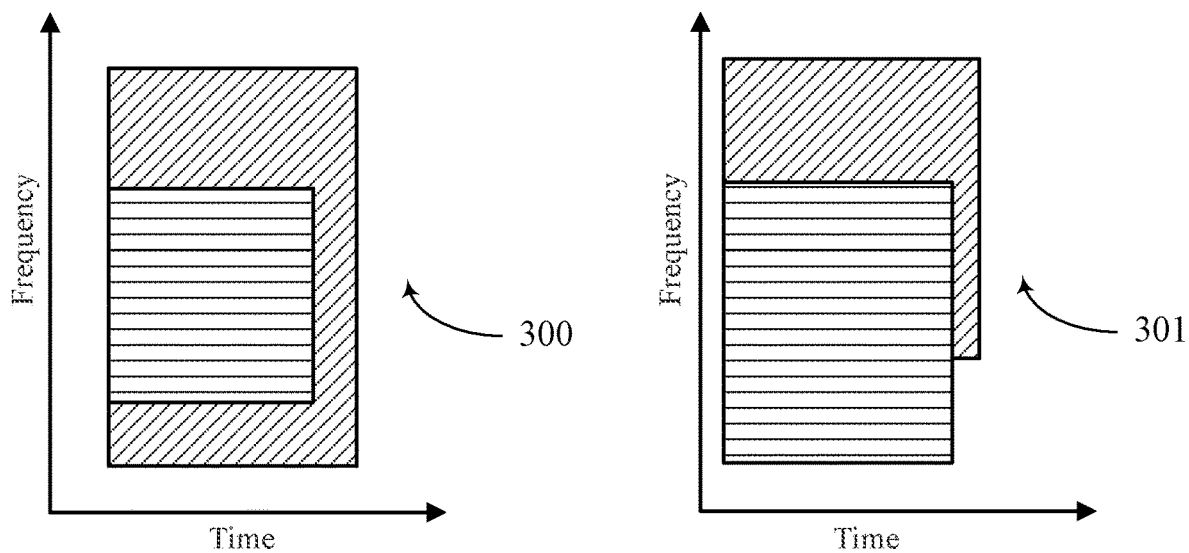
FIGS. 3A and 3B illustrate examples of types of full-duplex communication that may be supported by configuration of frequency bands for full-duplex slots in accordance with various aspects of the present disclosure.
Figure 3B:
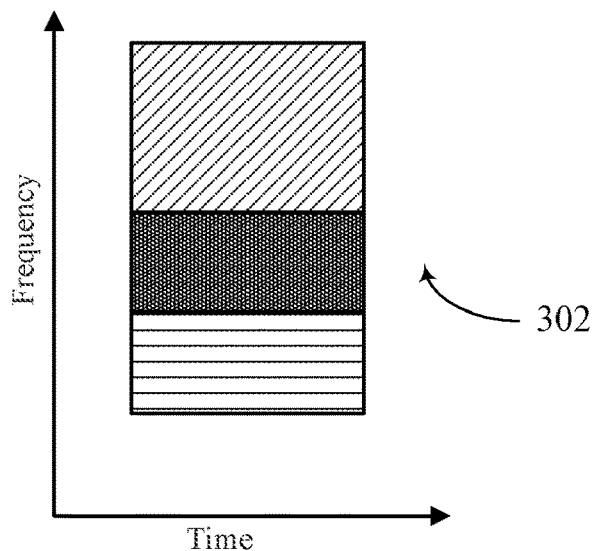

FIGS. 3A and 3B illustrate examples 300 through 302 of types of full-duplex communication that may be supported by configuration of frequency bands for full-duplex slots in accordance with various aspects of the present disclosure. In some examples, the examples 300 through 302 may be implemented by aspects of the wireless communications system 100 and wireless communications system 200.

FIG. 3A illustrates examples 300 and 301 of in-band full-duplex (IBFD) communications. Using IBFD, a device (e.g., a UE 115, a base station 105) may concurrently transmit and receive on overlapping time and frequency resources (e.g., BWPs, RBs, resource elements) corresponding to a frequency configuration. For example, with reference to wireless communications system 200 of FIG. 2 and example 300 of FIG. 3A, UE 215-a may receive downlink transmissions 210-a over downlink resources 305 (e.g., BWPs, RBs, resource elements) and transmit uplink data transmissions 220 over uplink resources 310 (e.g., BWPs, RBs, resource elements), where the downlink resources 305 and uplink resources 310 fully overlap in time and frequency. In another example, with reference to example 301 of FIG. 3B, the downlink resources 305 and uplink resources 310 may partially overlap.

FIG. 3B illustrates an example 302 of sub-band frequency division duplex (FDD) communications. Using sub-band FDD, a device (e.g., a UE 115, a base station 105) may transmit and receive at the same time but on different (non-overlapping) frequency resources (e.g., corresponding to a frequency configuration). For example, with reference to wireless communications system 200 of FIG. 2, UE 215-a may receive downlink transmissions 210-a over downlink resources 305 and transmit uplink data transmissions 220 over uplink resources 310. In the example of FIG. 2, the downlink resources 305 and uplink resources 310 may overlap in the time domain but not the frequency domain. The downlink resources 305 may be separated from the uplink resources 310 in the frequency domain, for example, by guard band 315.

Figure 4:
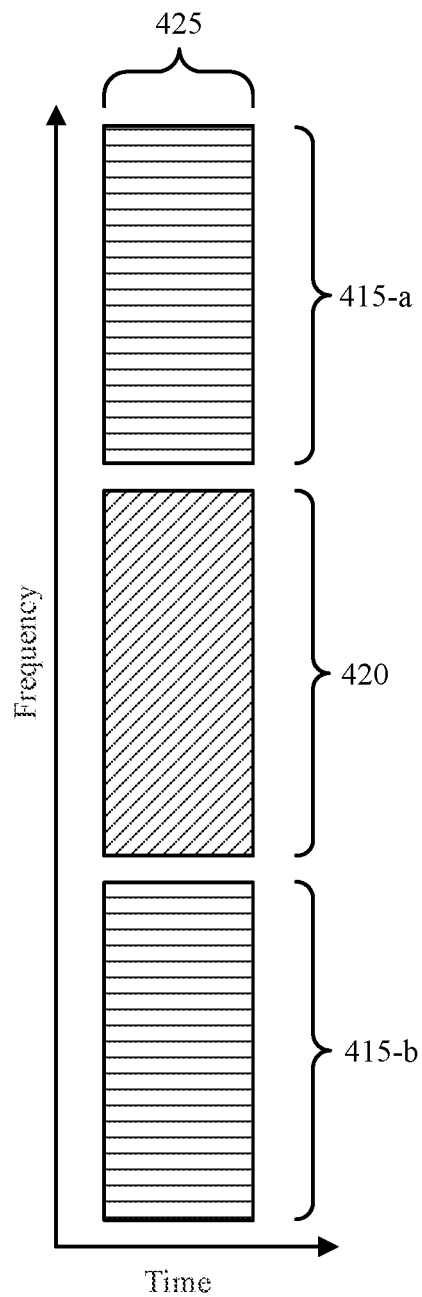
FIG. 4 illustrates an example of a frequency band configuration that supports configuration of frequency bands for full-duplex slots in accordance with aspects of the present disclosure.

FIG. 4 illustrates an example of a frequency band configuration 400 that may be supported by a configuration of frequency bands for full-duplex slots in accordance with various aspects of the present disclosure. In some examples, the frequency band configuration 400 may be implemented by aspects of the wireless communications system 100 and wireless communications system 200.

For example, with reference to wireless communications system 200 of FIG. 2 and frequency band configuration 400 of FIG. 4, UE 215-a may receive downlink transmissions 210-a over downlink frequency bands 415-a and 415-b and transmit uplink data transmissions 220 over uplink frequency band 420. The downlink frequency bands 415-a and 415-b may include downlink resources 405 (e.g., BWPs, RBs, resource elements). The uplink frequency band 420 may include uplink resources 410 (e.g., BWPs, RBs, resource elements). In the example illustrated in FIG. 4, the downlink frequency bands 415-a and 415-b and the uplink frequency band 420 may overlap in the time domain but not in the frequency domain. Downlink frequency bands 415-a and 415-b may in some cases be spaced apart from the uplink frequency band 420 in the frequency domain by guard bands, as shown in the example of FIG. 4.

The downlink frequency bands 415-a and 415-b and the uplink frequency band 420 may be indicated in a frequency band configuration for a slot 425. In some aspects, the slot 425 may include any combination of downlink frequency bands 415, uplink frequency bands 420, and guard bands. The frequency band configuration may be applied to any number of slots 425. In some examples, each of the slots 425 may include any combination of downlink frequency bands 415, uplink frequency bands 420, and guard bands. In some aspects, frequency band configuration 400 may include multiple frequency band configurations, and each of the frequency band configurations may be applied to any number or combination of slots 425.

UE 215-a may receive a frequency configuration indication from a base station 105 (e.g., base station 205-a). The frequency configuration indication as described herein may also be referred to as a frequency configuration indication. The frequency configuration indication may include, for example, one or more indices for entries in a table. An index may respectively correspond to and indicate a row of the table. In some aspects, the frequency configuration indication may indicate the table (e.g., from a set of multiple supported tables). In some example aspects, the table may be stored on a memory of UE 215-a, base station 205-a, or both.

The table may include multiple entries, and each entry in the table may correspond to a different frequency band configuration. In some examples, each entry in the table (and thus each corresponding index) may specify frequency boundaries for one or more downlink frequency bands 415, uplink frequency bands 420, or guard bands associated with a slot 425. For example, each entry may indicate bounds (e.g., a lower bound and upper bound) for downlink frequency bands 415 associated with the slot 425. In some examples, each entry in the table may indicate bounds (e.g., a lower bound and upper bound) for uplink frequency bands 420 associated with the slot 425. In some other examples, each entry may indicate bounds (e.g., a lower bound and upper bound) for guard bands associated with the slot 425. The length of the table may be based on the number of frequency band configurations. In some aspects, the frequency configuration indication may be indicated as part of a downlink control information (DCI) message, and a number of DCI bits for indicating an index in the table. The length of the table may be based on the length of (number of entries or rows in) the table. For example, for a table with 256 frequency band configuration possibilities, a given row in the table may be indicated by a set of 8 bits in the DCI message.

In some examples, base station 205-a may communicate a format indication for a slot 425 (e.g., an indication of whether the slot 425 is a full-duplex slot of a given format or a half-duplex slot of a given direction, which in some cases may include an SFI) to the UE 215-a, for example, over RRC or DCI signaling. Base station 205-a may additionally communicate the frequency band configuration for the slot 425 using a frequency configuration indication (e.g., an index for an entry of a table, the index indicating a row of a table, the row corresponding to a frequency band configuration in the table) over control information (e.g., DCI or a MAC control element (MAC-CE)). In an example, base station 205-a may dynamically indicate frequency band configurations for a slot 425 through the control information (e.g., DCI) included in either a prior slot or in the slot 425.

UE 215-a may decode the control information (e.g., DCI or a MAC-CE) and identify, based on the decoding, a frequency band configuration or changes to the frequency band configuration for a slot 425 (or multiple slots 425). For example, UE 215-a may decode the control information (e.g., DCI or a MAC-CE) and identify, based on the decoding, an index indicating the frequency band configuration or changes to the frequency band configuration. In an example, based on the index, UE 215-a may identify a frequency band configuration associated with a slot 425 (or multiple slots 425). In an example, based on the index, UE 215-*a* may identify frequency boundaries for downlink frequency bands 415, uplink frequency bands 420, or guard bands associated with the slot 425 (or multiple slots 425).

Additionally, it is to be understood that table-based aspects of frequency configuration indication described herein may be combined with any one or more other examples of frequency configuration indications described herein. For example, a frequency configuration indication may include an index for an entry in a table, and the entry may include or otherwise correspond to one or more bitmaps, one or more start and lengths for frequency bands, and so forth in accordance with any examples of frequency configuration indications described herein.

Figure 5:
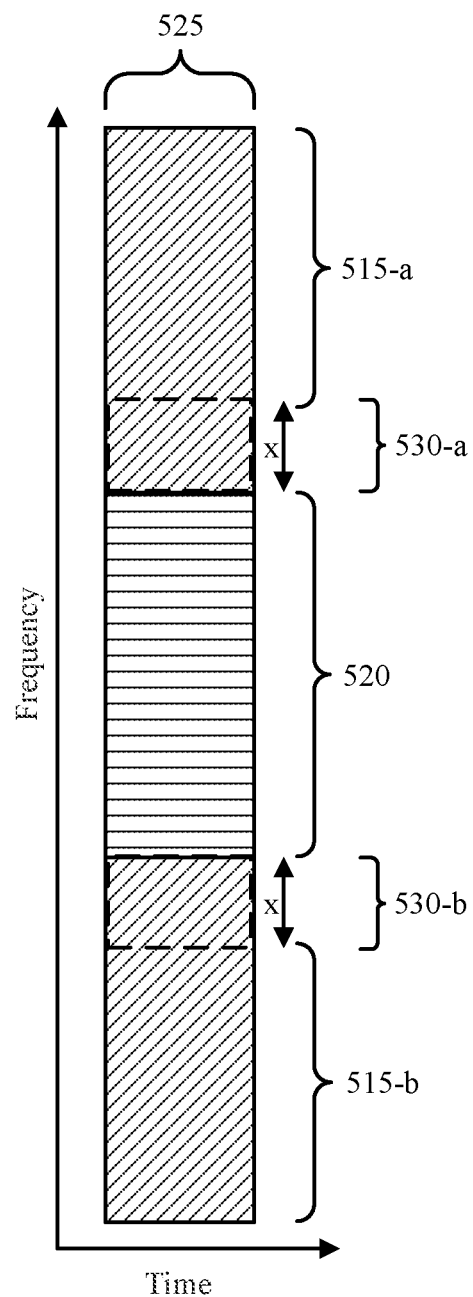
FIG. 5 illustrates an example of a frequency band configuration that supports configuration of frequency bands for full-duplex slots in accordance with aspects of the present disclosure.

FIG. 5 illustrates an example of a frequency band configuration 500 that may be supported by configuration of frequency bands for full-duplex slots in accordance with various aspects of the present disclosure. In some examples, the frequency band configuration 500 may be implemented by aspects of the wireless communications system 100 and wireless communications system 200. The frequency band configuration 500 may include downlink frequency bands 515-*a* and 515-*b* and an uplink frequency band 520 for a slot 525. Downlink frequency bands 515-*a* and 515-*b*, uplink frequency band 520, and slot 525 may be examples of aspects of downlink frequency bands 415-*a* and 415-*b*, uplink frequency band 420, and slot 425 described herein.

Base station 205-*a* may communicate a format indication for slot 525 to the UE 215-*a*, for example, over RRC signaling. The indication may indicate, for example, an indication of whether the slot 525 is a full-duplex slot. Base station 205-*a* may communicate another frequency configuration indication for the slot 525 over control information (e.g., DCI). The frequency configuration indication may include, for example, a bitmap. In an example, base station 205-*a* may dynamically indicate frequency band configurations per slot 525 through the control information (e.g., DCI).

UE 215-*a* may decode the control information (e.g., DCI) and identify, based on the decoding, a frequency band configuration or changes to the frequency band configuration for a slot 525 (or multiple slots 525). For example, UE 215-*a* may decode the control information (e.g., DCI) and identify, based on the decoding, the bitmap. In an example, based on bits within the bitmap, UE 215-*a* may identify a frequency band configuration associated with a slot 525 (or multiple slots 525). In an example, based on the bits within the bitmap, UE 215-*a* may identify frequency boundaries for downlink frequency bands 515, uplink frequency bands 520, or guard bands 530 associated with the slot 525 (or multiple slots 525).

Each bit within the bitmap may correspond to a respective frequency range. For example, each bit within the bitmap may correspond to an RB (or corresponding frequency range) within an operating band. In some other examples, each bit within the bitmap may correspond to a physical resource group (PRG) (or corresponding frequency range) within the operating band. In an example, each PRG may include 2, 4, 8, or 16 RBs of the operating band, but the size of each PRG is not limited thereto.

Bits of a first logic value (e.g., 1) within the bitmap may indicate that the respective frequency range is for downlink communications (e.g., downlink frequency band 515-*a*, downlink frequency band 515-*b*) within the slot 525, and bits of a second logic value (e.g., 0) may indicate that the respective frequency range is for uplink communications (e.g., uplink frequency band 520) within the slot 525. Different frequency bands (each composed of one or more constituent frequency ranges respectively corresponding to the bits of the bitmaps) thus may be indicated by sets of contiguous bits. For example, a set of contiguous bits of the first logic value (e.g., 1) may indicate a corresponding downlink frequency band (e.g., downlink frequency band 515-*a*, downlink frequency band 515-*b*), and a set of contiguous bits of the second logic value (e.g., 0) may indicate a corresponding uplink frequency band (e.g., uplink frequency band 520).

In some aspects, boundaries between neighboring downlink and uplink bands (e.g., a boundary between downlink frequency band 515-*a* and uplink frequency band 520, a boundary between downlink frequency band 515-*b* and uplink frequency band 520) as nominally (preliminarily) indicated by the bitmap may be adjusted to determine one or more guard bands. The UE 115 may determine guard bands 530 that separate (are between in the frequency domain) neighboring downlink and uplink bands, for example, based on the adjustments.

For example, a guard band between neighboring (adjacent) downlink frequency bands and uplink frequency bands may be determined by reducing a span of the preliminary downlink frequency band by a fixed amount, by reducing a span of the preliminary uplink frequency band by a fixed amount, or by reducing both a span of the preliminary downlink frequency band and a span of the u preliminary plink frequency band by a fixed amount.

For example, a UE 115 may determine guard band 530-*a* between downlink frequency band 515-*a* and uplink frequency band 520. In some example aspects, guard band 530-*a* may be determined by reallocating a portion (e.g., a frequency range equal to the amount 'x') of downlink resources 505 (e.g., BWPs, RBs, resource elements) initially allocated (e.g., by the bitmap) to downlink frequency band 515-*a* and nearest to the neighboring uplink frequency band 520 by an amount 'x', in which case guard band 530-*a* may span a frequency range equal to the amount 'x'. As another example, guard band 530-*a* may be determined by reallocating a portion (e.g., a frequency range equal to the amount 'x') of uplink resources 510 (e.g., BWPs, RBs, resource elements) initially allocated (e.g., by the bitmap) to uplink frequency band 520 and nearest to the neighboring downlink frequency band 515-*a* by the amount 'x', in which guard band 530-*a* may also span a frequency range equal to the amount 'x'. Though the guard band 530-*a* may span a frequency range equal to the amount 'x' in either example, the guard band 530-*a* may span higher frequencies in the first example than in the second example, the downlink frequency band 515-*a* may be smaller in the first example than in the second example, and the uplink frequency band 520 may be larger in the first example than in the second example.

And as another example, guard band 530-*a* may be determined by reallocating both a portion (e.g., a first frequency range less than the amount 'x,' such as 'x/2' for example) of downlink resources 505 initially allocated (e.g., by the bitmap) to downlink frequency band 515-*a* and a portion (e.g., a second frequency range equal to the amount 'x' minus the first frequency range) of uplink resources 510 initially allocated (e.g., by the bitmap) to uplink frequency band 520. In this example, guard band 530-*a* may span a frequency range equal to the amount 'x', downlink frequency band 515-*a* may be larger than in the first example above but smaller than in the second example above, and uplink frequency band 520 may be smaller than in the first example above but larger than in the second example above.

And as yet another example, guard band 530-*a* may be determined by reallocating both a portion (e.g., a first frequency range equal to the amount 'x') of downlink resources 505 initially allocated (e.g., by the bitmap) to downlink frequency band 515-*a* and a portion (e.g., a second frequency range equal to the amount 'x') of uplink resources 510 initially allocated (e.g., by the bitmap) to uplink frequency band 520. In this example, guard band 530-*a* may span a frequency range equal to double the amount 'x' (e.g., a frequency range equal to an amount '2x'). The examples described with reference to creating guard band 530-*a* may also be used to determine guard band 530-*b*, for example, with respect to downlink frequency band 515-*b* and uplink frequency band 520 (and a guard band between any other set of neighboring frequency bands of different directions).

In some examples, UE 215-*a* may receive an indication (e.g., via RRC signaling or control information such as DCI) of whether to adjust the boundaries by reducing the span of the preliminary downlink frequency band, by reducing the span of the preliminary uplink frequency band, or by reducing the span of both. Additionally or alternatively, UE 215-*a* may receive an indication (e.g., via RRC signaling or control information such as DCI) of the amount of reduction to apply (e.g., an indication of the amount 'x' or another reduction amount as discussed in the above examples). Additionally or alternatively, UE 215-*a* may receive an indication (e.g., via RRC signaling or control information such as DCI) of the size (span or granularity) of each of the respective frequency ranges for the bits of the bitmap (e.g., how large of a frequency range is allocated by a single bit of the bitmap, such as how many RBs or resource block groups (RBGs) are allocated by a single bit of the bitmap), which may be referred to as a granularity of the bitmap.

Figure 6:
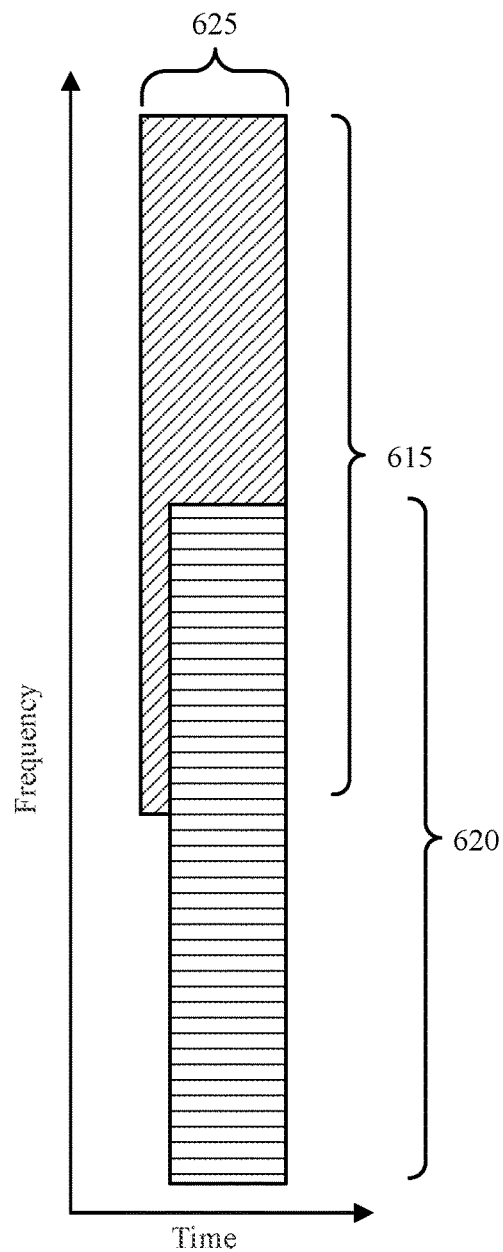
FIG. 6 illustrates an example of a frequency band configuration that supports configuration of frequency bands for full-duplex slots in accordance with aspects of the present disclosure.

FIG. 6 illustrates an example of a frequency band configuration 600 that may be supported by configuration of frequency bands for full-duplex slots in accordance with various aspects of the present disclosure. In some examples, the frequency band configuration 600 may be implemented by aspects of wireless communications system 100 and wireless communications system 200. The frequency band configuration 600 may include downlink frequency band 615 and uplink frequency band 620 that at least partially overlap in both time (e.g., in a TDD band) and frequency for a slot 625. Base station 205-*a* may communicate a frequency configuration indication for slot 625 (or multiple slots 625) over control information (e.g., DCI).

In some cases, the frequency configuration indication may include, for example, a set of bitmaps in which each bitmap corresponds to a respective direction of communication (e.g., a first bitmap for downlink, and a second bitmap for uplink). Each bit within the bitmaps may correspond to a respective frequency range. Bits of a first logic value (e.g., 1) within a bitmap may indicate that the respective frequency range is activated ("ON") for the associated direction within slot 625. Bits of a second logic value (e.g., 0) within the bitmap may indicate that the respective frequency range is deactivated ("OFF") for the associated direction (e.g., downlink or uplink) within slot 625.

Thus, one or more sets of contiguous bits within a bitmap may indicate one or more frequency bands for the direction associated with the bitmap. For example, a set of contiguous bits of the first logic value (e.g., 1) may indicate that the corresponding respective frequency ranges are activated ("ON") for the associated direction (e.g., downlink or uplink). In some examples, a set of contiguous bits of the second logic value (e.g., 0) may indicate that a respective frequency range is deactivated ("OFF") for the associated direction (e.g., downlink or uplink). Thus, in the example of FIG. 6, the downlink frequency band 615 may be indicated by a set of contiguous bits having the first logic value within a first bitmap, and the uplink frequency band 620 may be indicated by a set of contiguous bits having the first logic value within a second bitmap.

In some cases, the frequency configuration indication may include respective start and length indications for each of downlink frequency band 615 and uplink frequency band 620 for slot 625 (or multiple slots 625). For example, a start indication for a frequency band may indicate an upper or lower bound of the frequency band, and a length indication for a frequency band may indicate a span (size, width) of the frequency band in the frequency domain.

UE 215-*a* may decode the frequency configuration indication applicable to slot 625 and identify, based on the decoding, a frequency band configuration or changes to the frequency band configuration for a slot 625 (or multiple slots 625). For example, UE 215-*a* may decode the control information (e.g., DCI) and identify, based on the decoding, a set of bitmaps (e.g., the first bitmap, the second bitmap) and interpret them as described herein. As another example, UE 215-*a* may decode the control information (e.g., DCI) and identify, based on the decoding, a respective start indication and a respective length indication for each frequency band included in the slot 625.

In some cases, UE 215-*a* may receive an indication (e.g., via RRC signaling or control information such as DCI) of the size (span or granularity) of each of the respective frequency ranges for the bits of the bitmap (e.g., how large of a frequency range is allocated by a single bit of the bitmap, such as how many RBs or RBGs are allocated by a single bit of the bitmap), which may be referred to as a granularity of the bitmap.

Figure 7:
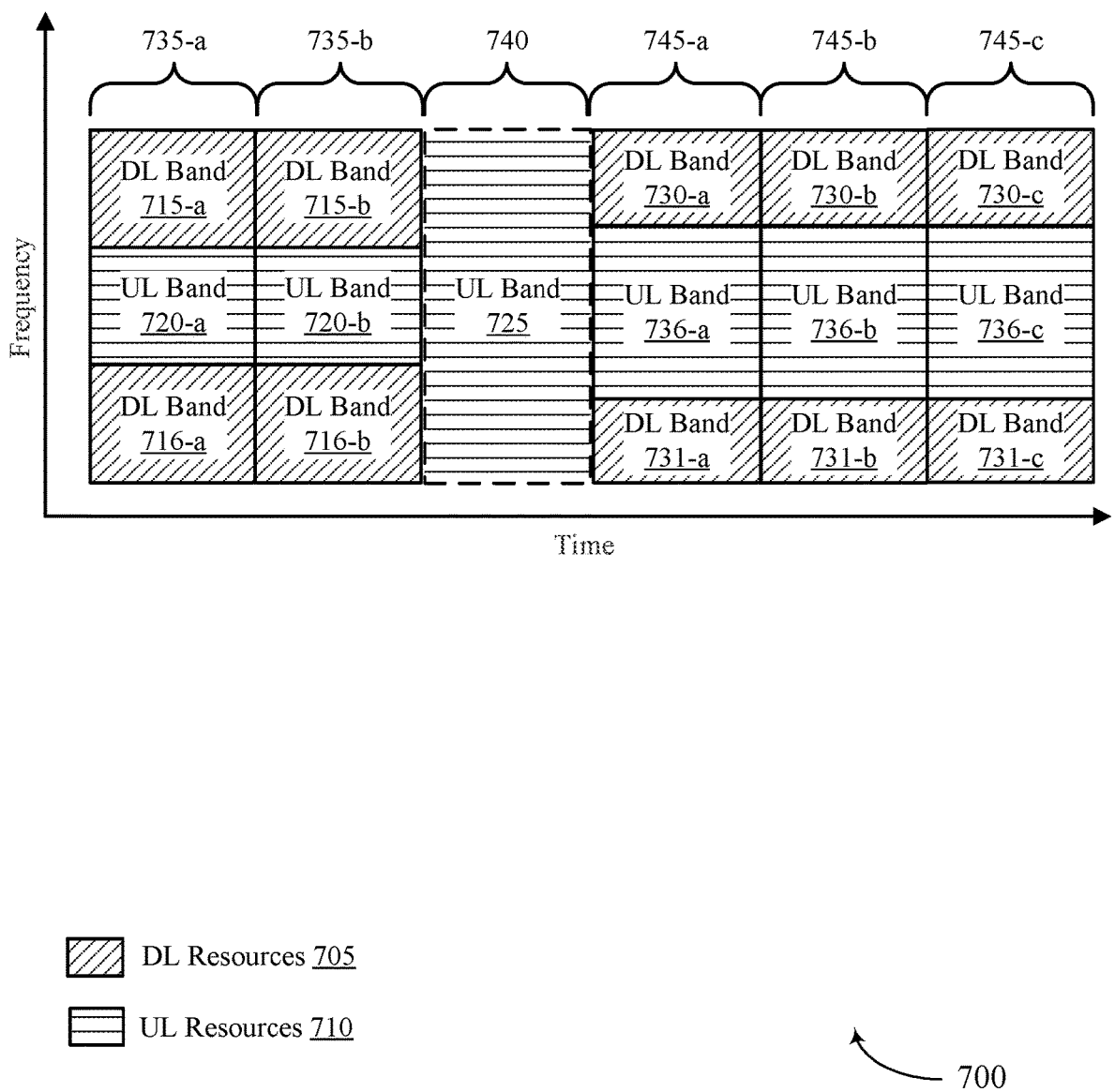
FIG. 7 illustrates an example of a frequency band configuration that supports configuration of frequency bands for full-duplex slots in accordance with aspects of the present disclosure.

FIG. 7 illustrates an example of a frequency band configuration 700 that may be supported by configuration of frequency bands for full-duplex slots in accordance with various aspects of the present disclosure. In some examples, the frequency band configuration 700 may be implemented by aspects of wireless communications system 100 and wireless communications system 200.

The frequency band configuration 700 may apply to slots 735-*a*, 735-*b*, 740, 745-*a*, 745-*b*, and 745-*c*. Slots 735-*a*, 735-*b*, 745-*a*, 745-*b*, and 745-*c* may be full-duplex slots, and slot 740 may be a half-duplex slot. Slot 735-*a* may include downlink frequency bands 715-*a* and 716-*a* and an uplink frequency band 720-*a*, and slot 735-*b* may include downlink frequency bands 715-*b* and 716-*b* and an uplink frequency band 720-*b*. Slot 740 may include an uplink frequency band 725. Slot 745-*a* may include downlink frequency bands 730-*a* and 731-*a* and an uplink frequency band 736-*a*, slot 745-*b* may include downlink frequency bands 730-*b* and 731-*b* and an uplink frequency band 736-*b*, and slot 745-*c* may include downlink frequency bands 730-*c* and 731-*c* and an uplink frequency band 736-*c*. Downlink frequency bands and uplink frequency bands may be referred to in FIG. 7 as DL bands and UL bands, respectively.

Downlink frequency bands 715, 716, 730, and 731 may be examples of downlink frequency bands 415, 515, and 615 described herein. Uplink frequency bands 720, 725, or 736 may be examples of uplink frequency bands 420, 520, or 620 described herein. Slots 735, 740, and 745 may be examples of aspects of slots 425, 525, or 625 described herein.

Base station 205-*a* may communicate a format indication for slots 735, 740, and 745 to the UE 215-*a*, for example, over RRC or DCI signaling. The indication may include a format of the slots 735, 740, and 745, for example, an indication of whether the slots 735, 740, and 745 are full-duplex slots or half-duplex slots.

Base station 205-*a* may indicate (e.g., via one or more DCI messages) any number of frequency configuration indications for the full-duplex slots 735-*a*, 735-*b*, 745-*a*, 745-*b*, 745-*c*, each of which may be in accordance with any of the examples described herein.

In some cases, a frequency configuration indications for one full-duplex slot (e.g., slot 735-*a*) may apply to any subsequent full-duplex slot (e.g., slot 735-*b*) until a new (updated) frequency band configuration is indicated (e.g., until UE 215-*a* receives a new frequency band configuration from base station 205-*a* for slot 745-*a*).

In some cases, two or more frequency band configurations for full-duplex slots may be indicated, each with different periodicities. For example, every fourth full-duplex slot may have a first frequency band configuration based on a first frequency configuration indication, and each set of three intervening full-duplex slots may have a second frequency band configuration based on a second frequency configuration indication. It is to be understood that these and any other specific numeric examples herein are provided purely for illustrative clarity and are not limiting. In some cases, the periodicity of frequency band configuration may be exclusive of half-duplex slots, and thus a half-duplex slot (e.g., slot 740) may not be considered by UE 215-*a* for counting purposes (e.g., when determining, based on the periodicity, the frequency band configuration for a subsequent full-duplex slot). Thus, in an example, UE 215-*a* may count a quantity of full-duplex slots between slot 735-*a* through slot 745-*c*, in which the counting includes skipping any half-duplex slots (e.g., slot 740) between slots 735-*a* and slot 745-*c*.

Figure 8:
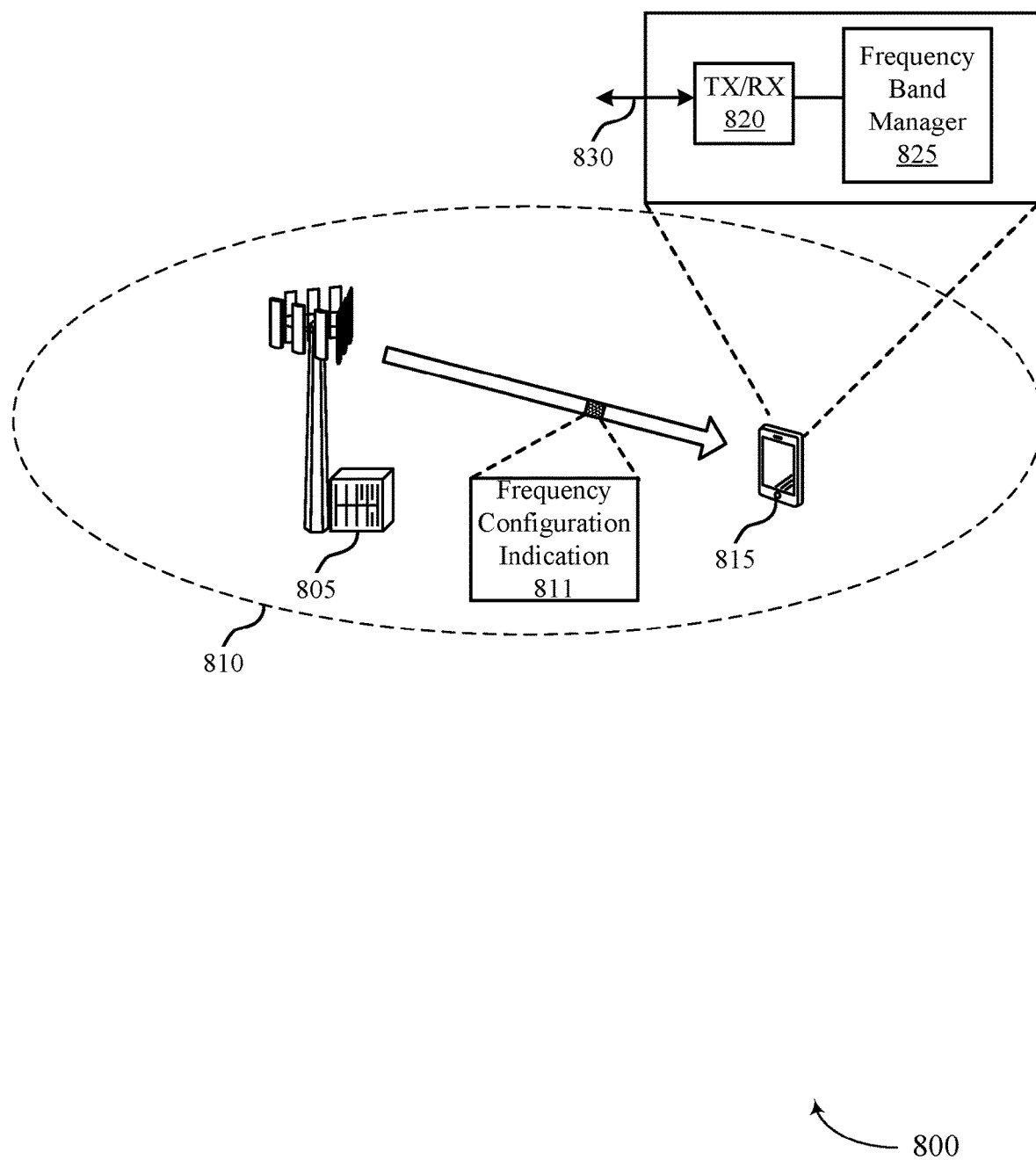
FIG. 8 illustrates an example of a wireless communications system that supports configuration of frequency bands for full-duplex slots in accordance with aspects of the present disclosure.

FIG. 8 illustrates an example of a wireless communications system 800 that supports configuration of frequency bands for full-duplex slots in accordance with various aspects of the present disclosure. In some examples, the wireless communications system 800 may implement aspects of wireless communications system 100 and wireless communications system 200. Wireless communications system 800 may include UE 815, which may be an example of a UE 115 or UE 215-*a* as described herein. Wireless communications system 800 may also include base station 805, which may be an example of a base station 105 or base station 205-*a* as described herein.

UE 815 may include a transceiver 820 and a frequency band manager 825. The transceiver 820 may be, for example, a transceiver 1220 as described with reference to FIG. 12. The frequency band manager 825 may be implemented by aspects of the frequency band component 1020 or the frequency band component 1110 described with reference to FIGS. 10 and 11. The frequency band manager 825 may be implemented by aspects of a processor, for example, such as a processor 1240 described with reference to FIG. 12. The transceiver 820 and the frequency band manager 825 may be in communication with one another (e.g., via one or more buses). The transceiver 820 may transmit or receive radio frequency signals 830. Base station 805 may provide a coverage area 110-*a* supportive of the communication of signals according to one or more radio access technologies (e.g., NR, LTE, or both). The coverage area 110-*a* may be an example of the coverage area 110 described herein. The radio access technologies may share the same carrier frequency or at least partially overlapping frequency ranges. It is to be understood that references to the radio access technologies (e.g., NR, LTE) described herein are provided for illustrative purposes only, and different radio access technologies not specifically referred to herein may be used interchangeably with the radio access technologies described herein.

UE 815 may receive a frequency configuration indication 811 for a slot for full-duplex communication. Frequency configuration indication 811 may be a frequency configuration indication (aka, frequency band configuration indication) in accordance with any of the examples described herein, alone or in combination, and may indicate at least one downlink frequency band for downlink communications and at least one uplink frequency band for uplink communications within the slot, some examples, frequency configuration indication 811 may be included in a DCI message. Based on decoding frequency configuration indication 811, UE 815 may receive within the slot, at least one downlink communication within an indicated downlink frequency band, and UE 815 may transmit, within the slot, at least one uplink communication within an indicated uplink frequency band.

In some examples, frequency configuration indication 811 may include an index for an entry of a table as described with reference to FIG. 4. UE 815 may identify, based on the index and the table, lower and upper bounds for at least one downlink frequency band, lower and upper bounds for at least one uplink frequency band. And in some cases, UE 815 may identify, based on the index and the table, at least one guard band between neighboring downlink and uplink frequency bands.

In some examples, frequency configuration indication 811 may include or otherwise indicate a bitmap as described with reference to FIG. 5. Each bit of the bitmap may correspond to a respective frequency range, and a bit having a first logic value may indicate that the respective frequency range is activated for one direction of communication, while the bit having a second logic value may indicate that the respective frequency range is activated for another direction of communication. The one or more downlink frequency bands may be indicated at least in part by one or more sets of one or more contiguous bits within the bitmap, where each of the one or more contiguous bits has a first logic value. The one or more uplink frequency bands may be indicated at least in part by one or more other sets of one or more contiguous bits with the bitmap that each have a second logic value. UE 815 may determine, based on a first set of one or more contiguous bits each having the first logic value, a downlink frequency band. UE 815 may determine, based on a second set of one or more contiguous bits each having the second logic value, an uplink frequency band.

In some cases, frequency bands indicated by the bits of the bitmap may be preliminary, and one or more preliminary frequency bands may be reduced in frequency span to determine a guard band. In some aspects, UE 815 may receive an indication (e.g., included in frequency configuration indication 811) of whether to reduce a preliminary downlink frequency band, a preliminary uplink frequency band, or both.

In some aspects, UE 815 may reduce, by an amount, a preliminary downlink frequency band based on adjusting a bound of the preliminary downlink frequency band that is nearest in frequency to a preliminary uplink frequency band. UE 815 may determine the downlink frequency band based on reducing the preliminary downlink frequency band. Additionally or alternatively, UE 815 may reduce, by the amount, a preliminary uplink frequency band based on adjusting a bound of the preliminary uplink frequency band that is nearest in frequency to a preliminary downlink frequency band. UE 815 may determine the uplink frequency band based on reducing the preliminary uplink frequency band. In some aspects, a guard band between the downlink frequency band and the uplink frequency band may span a frequency range of at least the amount. In some aspects, a guard band between the downlink frequency band and the uplink frequency band may span a frequency range of at least double the amount.

In some examples, frequency configuration indication 811 may include or otherwise indicate a set of bitmaps as described with reference to FIG. 6. For example, a first bitmap may correspond to the downlink direction and a second bitmap may correspond to the uplink direction. A downlink frequency band may be indicated by a first set of one or more contiguous bits within the first bitmap each having a first logic value, and an uplink frequency band may be indicated by a second set of one or more contiguous bits within the second bitmap each having the first logic value.

In some aspects, bits of a bitmap as described herein may each correspond to a respective frequency range, and UE 215-*a* may receive an indication (e.g., via frequency configuration indication 811) of a size for each of the respective frequency ranges (e.g., each of the respective frequency ranges may have a same indicated size).

In some example aspects, frequency configuration indication 811 may include or otherwise indicate a first indication of a bound (e.g., start frequency) for a downlink frequency band, a second indication of a frequency range (e.g., length or size) for the downlink frequency band, a third indication of a bound (e.g., start frequency) for an uplink frequency band, and a fourth indication of a frequency range (e.g., length or size) for the uplink frequency band.

In some aspects, frequency configuration indication 811 may be for a slot, and UE 815 may identify that a second slot is for full-duplex communication, the second slot subsequent to the slot. UE 815 may monitor for another frequency configuration indication for the second slot and, in some aspects, if UE 815 does not identify another frequency configuration indication for the second slot, UE 815 may determine that the frequency configuration indication 811 is also applicable to the second slot.

In some aspects, UE 815 the frequency configuration indication 811 may be associated with (e.g., may indicate) a first periodicity, and a second frequency configuration indication (not shown) may be associated with a second periodicity. UE 815 may determine that the frequency band configuration is for a first slot based on the first periodicity, and UE 815 may determine that the second frequency band configuration is for a second slot based on the second periodicity, the second slot subsequent to the slot. In some aspects, UE 815 may count a quantity of full-duplex slots between the slot and the second slot. In an example, the counting may include skipping any half-duplex slot between the slot and the second slot.

Figure 9:
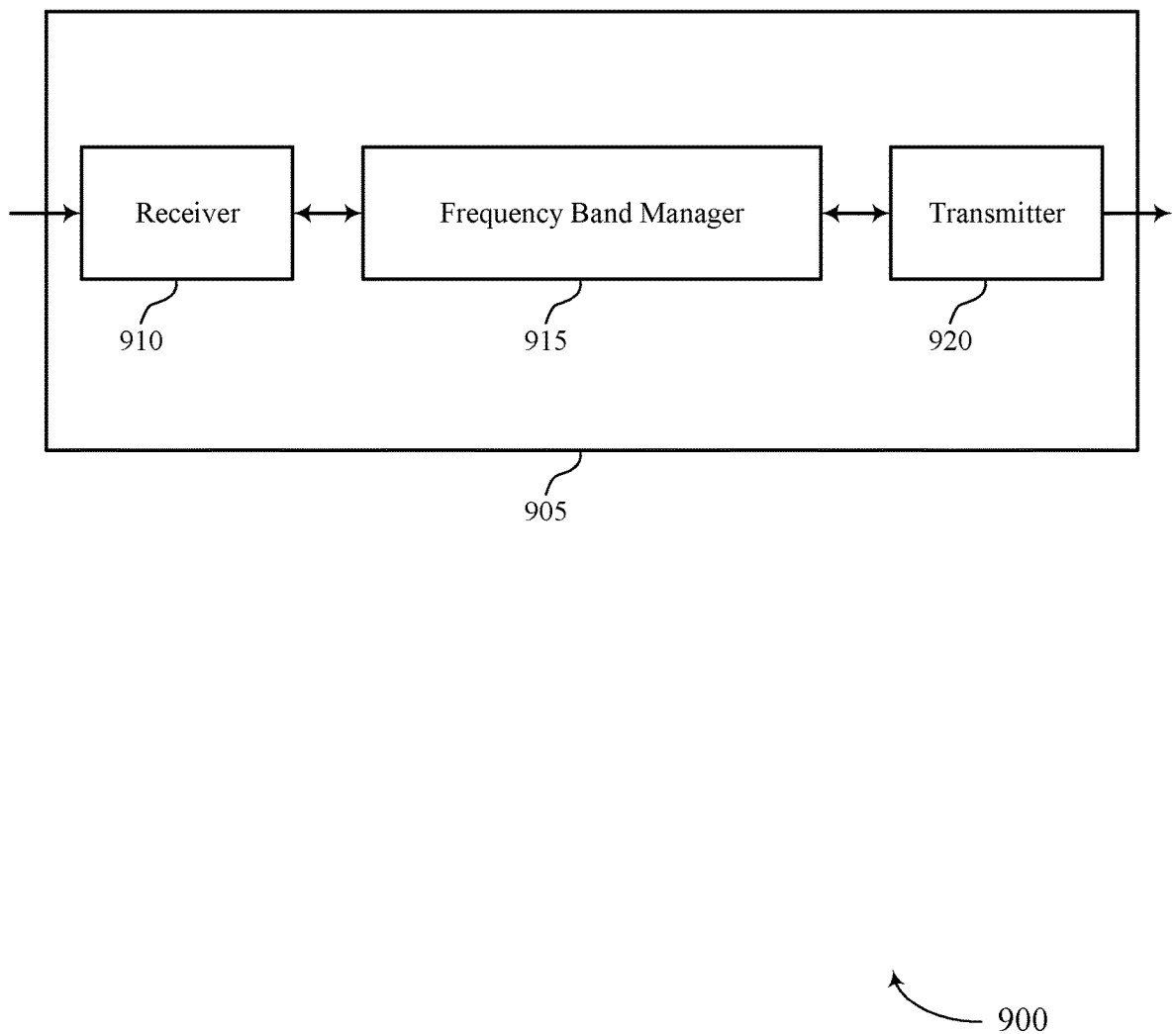
FIGS. 9 and 10 show block diagrams of devices that support configuration of frequency bands for full-duplex slots in accordance with aspects of the present disclosure.

FIG. 9 shows a block diagram 900 of a device 905 that supports configuration of frequency bands for full-duplex slots in accordance with various aspects of the present disclosure. The device 905 may be an example of aspects of a UE as described herein. The device 905 may include a receiver 910, a frequency band manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to configuration of frequency bands for full-duplex slots). Information may be passed on to other components of the device 905. The receiver 910 may be an example of aspects of a transceiver. The receiver 910 may utilize a single antenna or a set of antennas.

The frequency band manager 915 may receive an indication of a frequency band configuration for a slot, where the slot is for full-duplex communication, and where the indication of the frequency band configuration indicates a downlink frequency band for downlink communications within the slot and an uplink frequency band for uplink communications within the slot, receive, within the slot, a downlink communication within the downlink frequency band, and transmit, within the slot, an uplink communication within the uplink frequency band. The frequency band manager 915 may be an example of aspects of the frequency band manager 1210 described herein.

The frequency band manager 915, or its sub-components, may be implemented in hardware, code (e.g., software or firmware) executed by a processor, or any combination thereof. If implemented in code executed by a processor, the functions of the frequency band manager 915, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The frequency band manager 915, or its sub-components, may be physically located at various positions, including being distributed such that portions of functions are implemented at different physical locations by one or more physical components. In some examples, the frequency band manager 915, or its sub-components, may be a separate and distinct component in accordance with various aspects of the present disclosure. In some examples, the frequency band manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

By including or configuring the frequency band manager 915 in accordance with examples as described herein, the device 905 (e.g., a processor controlling or otherwise coupled to the receiver 910, the transmitter 920, the frequency band manager 915, or a combination thereof) may support techniques for an improved efficiency, flexibility, or reliability with which frequency band configurations may be indicated for full-duplex slots, which may help conserve system, device, or spectral resources, among other benefits.

The transmitter 920 may transmit signals generated by other components of the device 905. In some examples, the transmitter 920 may be collocated with a receiver 910 in a transceiver component. For example, the transmitter 920 may be an example of aspects of a transceiver. The transmitter 920 may utilize a single antenna or a set of antennas.

Figure 10:
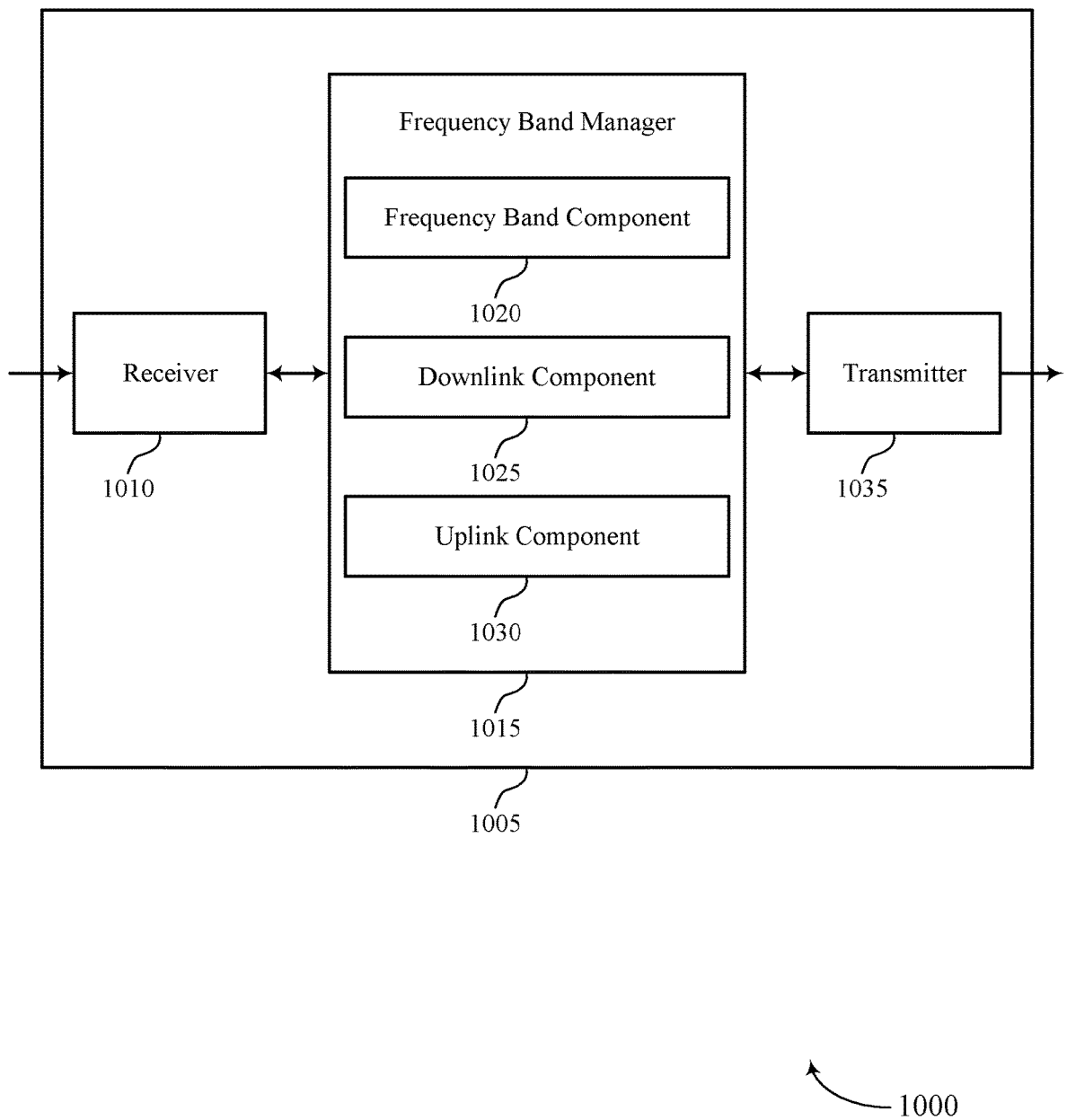

FIG. 10 shows a block diagram 1000 of a device 1005 that supports configuration of frequency bands for full-duplex slots in accordance with various aspects of the present disclosure. The device 1005 may be an example of aspects of a device 905 or a UE 115 as described herein. The device 1005 may include a receiver 1010, a frequency band manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to configuration of frequency bands for full-duplex slots). Information may be passed on to other components of the device 1005. The receiver 1010 may be an example of aspects of a transceiver. The receiver 1010 may utilize a single antenna or a set of antennas.

The frequency band manager 1015 may be an example of aspects of the frequency band manager 915 as described herein. The frequency band manager 1015 may include a frequency band component 1020, a downlink component 1025, and an uplink component 1030. The frequency band manager 1015 may be an example of aspects of the frequency band manager 1210 described herein.

The frequency band component 1020 may receive an indication of a frequency band configuration for a slot, where the slot is for full-duplex communication, and where the indication of the frequency band configuration indicates a downlink frequency band for downlink communications within the slot and an uplink frequency band for uplink communications within the slot.

The downlink component 1025 may receive, within the slot, a downlink communication within the downlink frequency band.

The uplink component 1030 may transmit, within the slot, an uplink communication within the uplink frequency band.

The transmitter 1035 may transmit signals generated by other components of the device 1005. In some examples, the transmitter 1035 may be collocated with a receiver 1010 in a transceiver component. For example, the transmitter 1035 may be an example of aspects of a transceiver. The transmitter 1035 may utilize a single antenna or a set of antennas.

Figure 11:
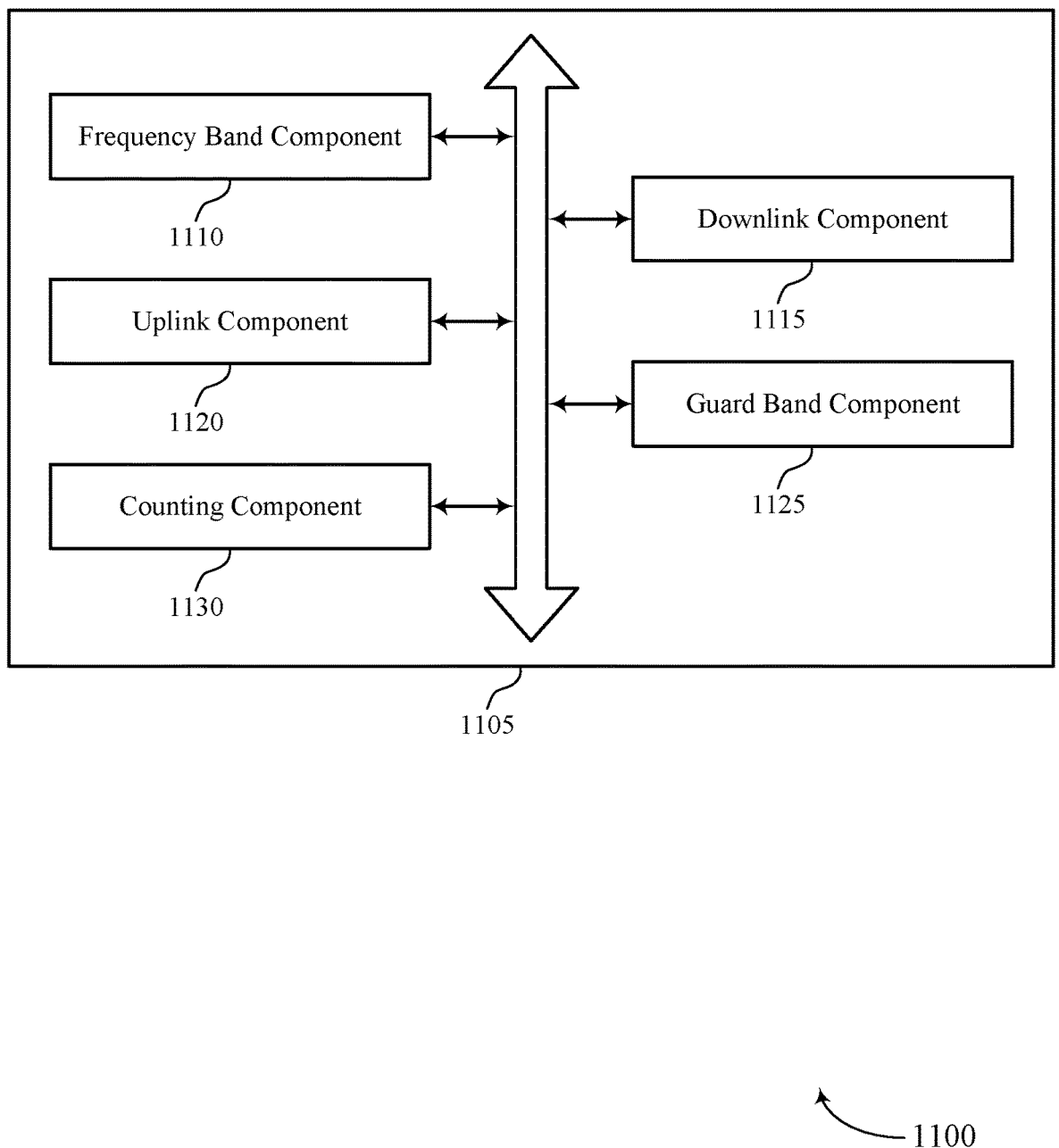
FIG. 11 shows a block diagram of a frequency band manager that supports configuration of frequency bands for full-duplex slots in accordance with aspects of the present disclosure.

FIG. 11 shows a block diagram 1100 of a frequency band manager 1105 that supports configuration of frequency bands for full-duplex slots in accordance with various aspects of the present disclosure. The frequency band manager 1105 may be an example of aspects of a frequency band manager 915, a frequency band manager 1015, or a frequency band manager 1210 described herein. The frequency band manager 1105 may include a frequency band component 1110, a downlink component 1115, an uplink component 1120, a guard band component 1125, and a counting component 1130. Each of these components may communicate, directly or indirectly, with one another (e.g., via one or more buses).

The frequency band component 1110 may receive an indication of a frequency band configuration for a slot, where the slot is for full-duplex communication, and where the indication of the frequency band configuration indicates a downlink frequency band for downlink communications within the slot and an uplink frequency band for uplink communications within the slot.

In some examples, the frequency band component 1110 may identify, based on the index and the table, a lower bound for the downlink frequency band, an upper bound for the downlink frequency band, a lower bound for the uplink frequency band, and an upper bound for the uplink frequency band. In some cases, the index is included in a DCI message or a MAC-CE.

In some examples, the frequency band component 1110 may identify, based on the index and the table, a third frequency band for one of downlink communications or uplink communications within the slot. In some examples, the frequency band component 1110 may determine, based on the first set of one or more contiguous bits, a preliminary downlink frequency band. In some examples, the frequency band component 1110 may determine, based on the second set of one or more contiguous bits, a preliminary uplink frequency band.

In some examples, the frequency band component 1110 may reduce, by an amount, the preliminary downlink frequency band based on adjusting a bound of the preliminary downlink frequency band that is nearest in frequency to the preliminary uplink frequency band. In some examples, the frequency band component 1110 may determine the downlink frequency band based on reducing the preliminary downlink frequency band.

In some examples, the frequency band component 1110 may reduce, by the amount, the preliminary uplink frequency band based on adjusting a bound of the preliminary uplink frequency band that is nearest in frequency to the preliminary downlink frequency band. In some examples, the frequency band component 1110 may determine the uplink frequency band based on reducing the preliminary uplink frequency band.

In some examples, the frequency band component 1110 may reduce, by an amount, the preliminary downlink frequency band or the preliminary uplink frequency band, where the reducing includes adjusting a bound of one of the preliminary downlink frequency band or the preliminary uplink frequency band. In some examples, the frequency band component 1110 may determine the downlink frequency band or the uplink frequency band based on the reducing. In some examples, the frequency band component 1110 may receive an indication of whether to reduce the preliminary downlink frequency band or reduce the preliminary uplink frequency band.

In some examples, the frequency band component 1110 may receive an indication of a size for each of the respective frequency ranges.

In some examples, the frequency band component 1110 may identify that a second slot is for full-duplex communication, the second slot subsequent to the slot. In some examples, the frequency band component 1110 may monitor for an indication of a second frequency band configuration for the second slot.

In some examples, the frequency band component 1110 may determine, based on the monitoring and an absence of the indication of the second frequency band configuration, that the frequency band configuration for the slot is also applicable to the second slot.

In some examples, the frequency band component 1110 may receive an indication of a second frequency band configuration, where the frequency band configuration is associated with a first periodicity and the second frequency band configuration is associated with a second periodicity.

In some examples, the frequency band component 1110 may determine that the frequency band configuration is for the slot based on the first periodicity. In some examples, the frequency band component 1110 may determine that the second frequency band configuration is for a second slot based on the second periodicity, the second slot subsequent to the slot.

In some cases, the indication of the frequency band configuration includes a bitmap, each bit of the bitmap corresponding to a respective frequency range. In some cases, the downlink frequency band is indicated at least in part by a first set of one or more contiguous bits within the bitmap each having a first logic value.

In some cases, the uplink frequency band is indicated at least in part by a second set of one or more contiguous bits with the bitmap each having a second logic value. In some cases, the indication of the frequency band configuration includes a first bitmap for the downlink frequency band and a second bitmap for the uplink frequency band.

In some cases, the downlink frequency band is indicated at least in part by a first set of one or more contiguous bits within the first bitmap each having a first logic value. In some cases, the uplink frequency band is indicated at least in part by a second set of one or more contiguous bits within the second bitmap each having the first logic value.

In some cases, the indication of the frequency band configuration includes a first indication of a bound for the downlink frequency band, a second indication of a frequency range for the downlink frequency band, a third indication of a bound for the uplink frequency band, and a fourth indication of a frequency range for the uplink frequency band.

The downlink component 1115 may receive, within the slot, a downlink communication within the downlink frequency band. In some examples, the downlink component 1115 may receive, within the second slot and based on the determining, a second downlink communication within the downlink frequency band.

The uplink component 1120 may transmit, within the slot, an uplink communication within the uplink frequency band. In some examples, the uplink component 1120 may transmit, within the second slot and based on the determining, a second uplink communication within the uplink frequency band.

The guard band component 1125 may identify, based on the index and the table, a guard band between the downlink frequency band and the uplink frequency band. In some cases, a guard band between the downlink frequency band and the uplink frequency band spans a frequency range of at least double the amount. In some cases, a guard band between the downlink frequency band and the uplink frequency band spans a frequency range of at least the amount.

The counting component 1130 may count a quantity of full-duplex slots between the slot and the second slot, where the counting includes skipping a half-duplex slot between the slot and the second slot.

Figure 12:
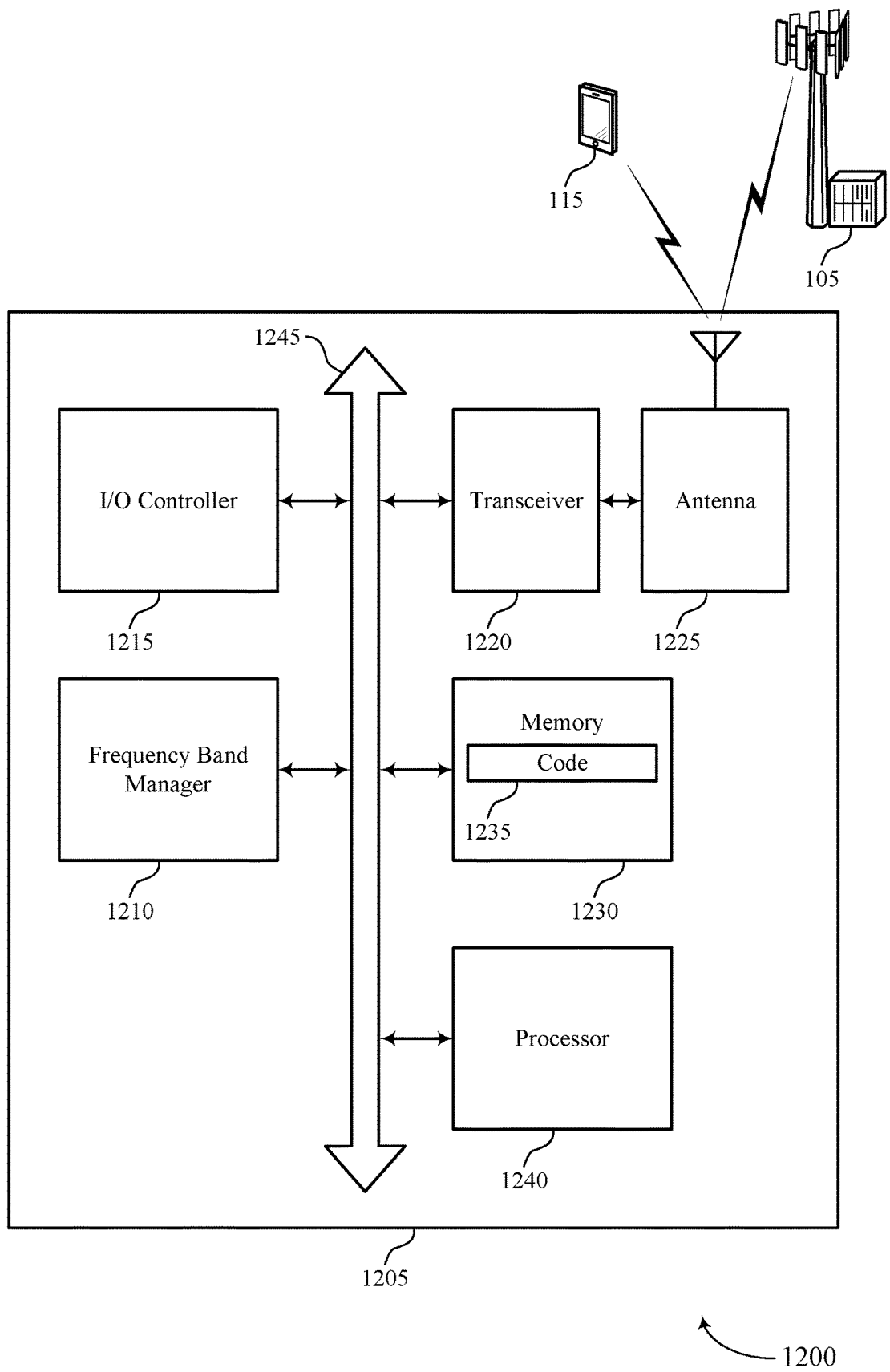
FIG. 12 shows a diagram of a system including a device that supports configuration of frequency bands for full-duplex slots in accordance with aspects of the present disclosure.

FIG. 12 shows a diagram of a system 1200 including a device 1205 that supports configuration of frequency bands for full-duplex slots in accordance with various aspects of the present disclosure. The device 1205 may be an example of or include the components of device 905, device 1005, or a UE 115 as described herein. The device 1205 may include components for bi-directional voice and data communications including components for transmitting and receiving communications, including a frequency band manager 1210. These components may be in electronic communication via one or more buses (e.g., bus) including a frequency band manager 1210, an I/O controller 1215, a transceiver 1220, an antenna 1225, memory 1230, and a processor 1240. These components may be in electronic communication via one or more buses (e.g., bus 1245).

The frequency band manager 1210 may receive an indication of a frequency band configuration for a slot, where the slot is for full-duplex communication, and where the indication of the frequency band configuration indicates a downlink frequency band for downlink communications within the slot and an uplink frequency band for uplink communications within the slot, receive, within the slot, a downlink communication within the downlink frequency band, and transmit, within the slot, an uplink communication within the uplink frequency band.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS @, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. In one aspect, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 835 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting enhancements for multiple radio protocol DSS).

By including or configuring the frequency band manager 1210 in accordance with examples as described herein, the device 1205 may support techniques for device 605 to reduce signal processing thereby decreasing power consumption.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
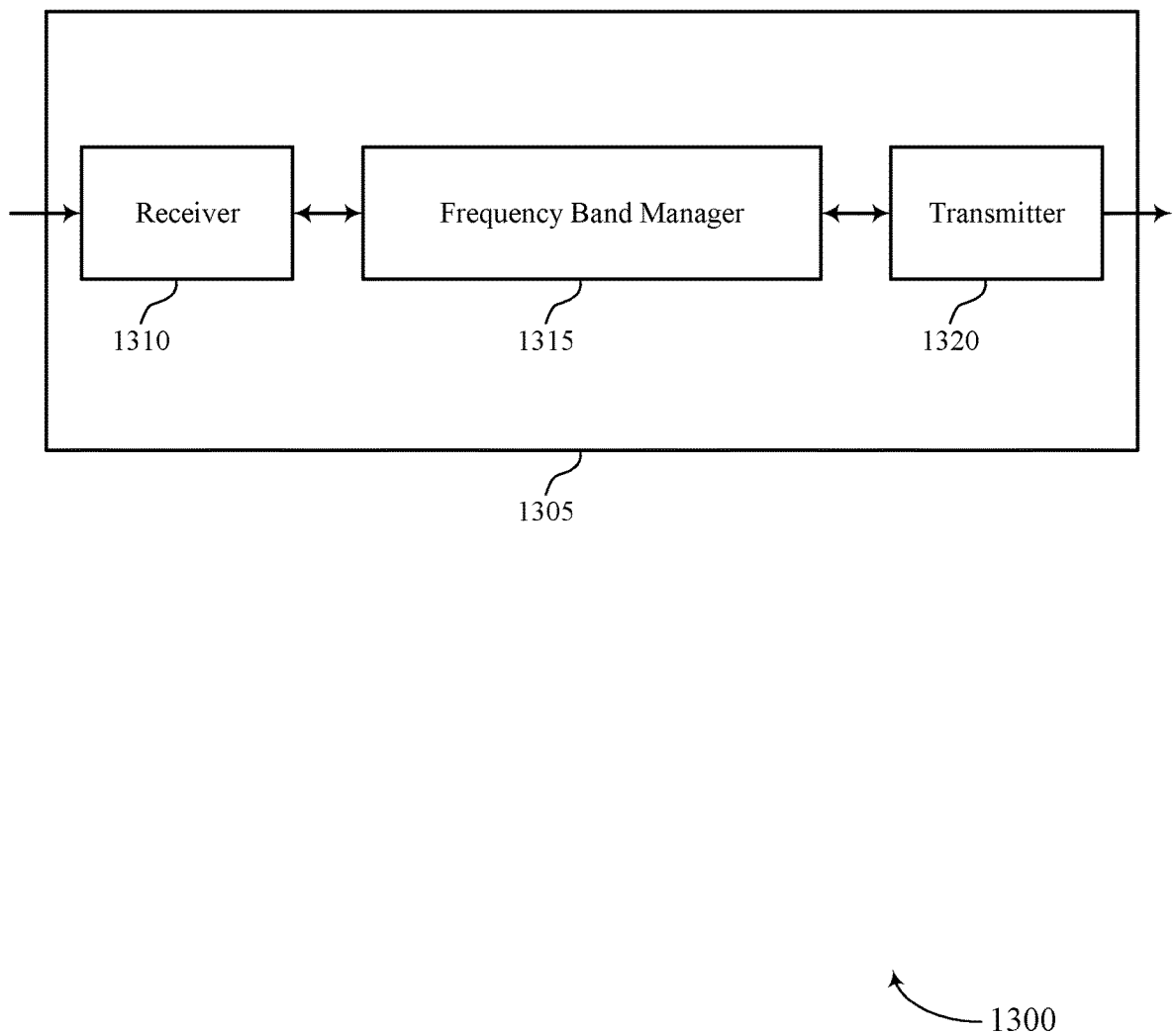
FIGS. 13 and 14 show block diagrams of devices that support configuration of frequency bands for full-duplex slots in accordance with aspects of the present disclosure.

FIG. 13 shows a block diagram 1300 of a device 1305 that supports configuration of frequency bands for full-duplex slots in accordance with various aspects of the present disclosure. The device 1305 may be an example of aspects of a base station 105 as described herein. The device 1305 may include a receiver 1310, a frequency band manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to configuration of frequency bands for full-duplex slots). Information may be passed on to other components of the device 1305. The receiver 1310 may be an example of aspects of the transceiver 1620 described with reference to FIG. 16. The receiver 1310 may utilize a single antenna or a set of antennas.

The frequency band manager 1315 may transmit an indication of a frequency band configuration for a slot, where the slot is for full-duplex communication, and where the indication of the frequency band configuration indicates a downlink frequency band for downlink communications within the slot and an uplink frequency band for uplink communications within the slot, transmit, within the slot, a downlink communication within the downlink frequency band, and receive, within the slot, an uplink communication within the uplink frequency band. The frequency band manager 1315 may be an example of aspects of the frequency band manager 1610 described herein.

The frequency band manager 1315, or its sub-components, may be implemented in hardware, code (e.g., software or firmware) executed by a processor, or any combination thereof. If implemented in code executed by a processor, the functions of the frequency band manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The frequency band manager 1315, or its sub-components, may be physically located at various positions, including being distributed such that portions of functions are implemented at different physical locations by one or more physical components. In some examples, the frequency band manager 1315, or its sub-components, may be a separate and distinct component in accordance with various aspects of the present disclosure. In some examples, the frequency band manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver component. For example, the transmitter 1320 may be an example of aspects of the transceiver 1620 described with reference to FIG. 16. The transmitter 1320 may utilize a single antenna or a set of antennas.

Figure 14:
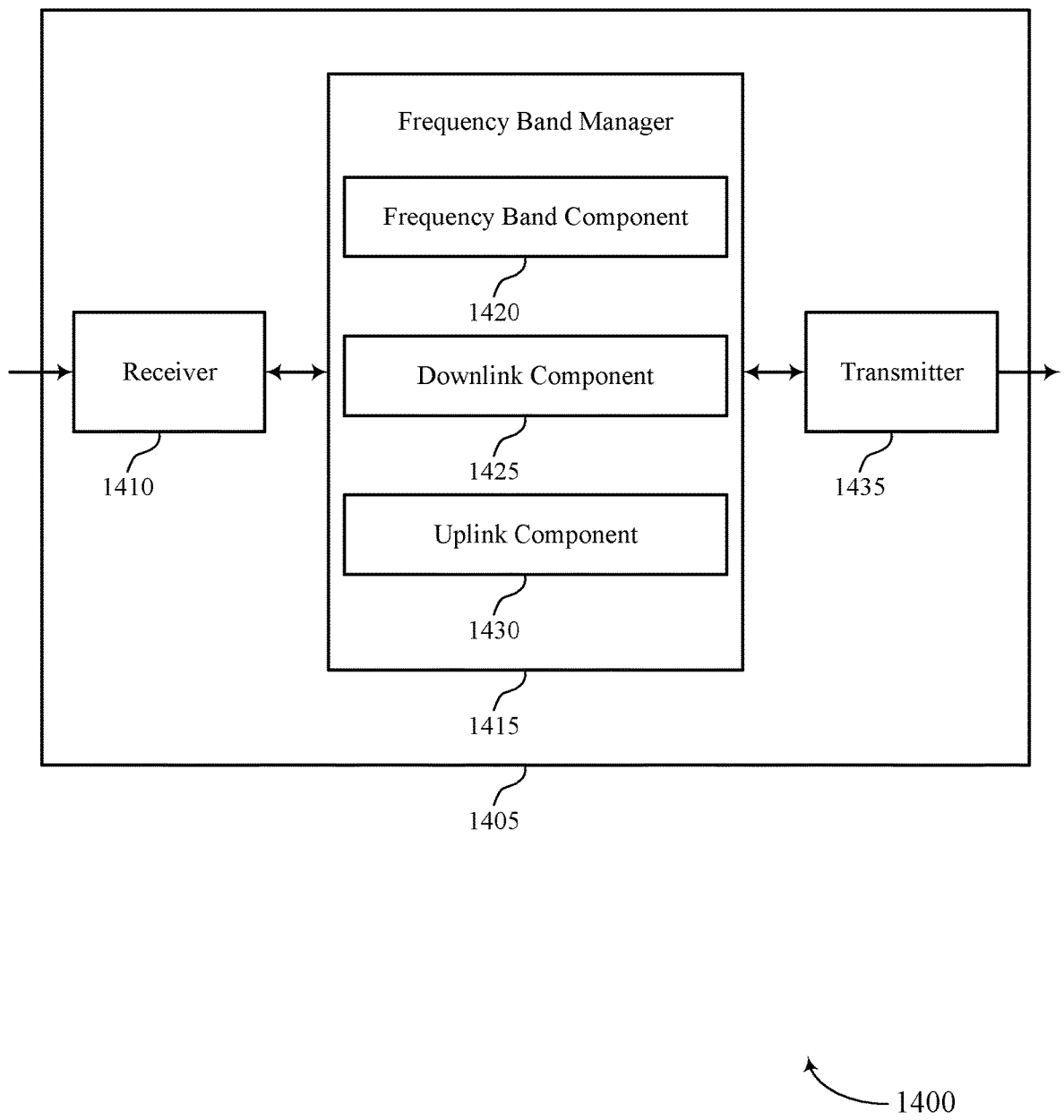

FIG. 14 shows a block diagram 1400 of a device 1405 that supports configuration of frequency bands for full-duplex slots in accordance with various aspects of the present disclosure. The device 1405 may be an example of aspects of a device 1305, or a base station 105 as described herein. The device 1405 may include a receiver 1410, a frequency band manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to configuration of frequency bands for full-duplex slots). Information may be passed on to other components of the device 1405. The receiver 1410 may be an example of aspects of the transceiver 1620 described with reference to FIG. 16. The receiver 1410 may utilize a single antenna or a set of antennas.

The frequency band manager 1415 may be an example of aspects of the frequency band manager 1315 as described herein. The frequency band manager 1415 may include a frequency band component 1420, a downlink component 1425, and an uplink component 1430. The frequency band manager 1415 may be an example of aspects of the frequency band manager 1610 described herein.

The frequency band component 1420 may transmit an indication of a frequency band configuration for a slot, where the slot is for full-duplex communication, and where the indication of the frequency band configuration indicates a downlink frequency band for downlink communications within the slot and an uplink frequency band for uplink communications within the slot.

The downlink component 1425 may transmit, within the slot, a downlink communication within the downlink frequency band.

The uplink component 1430 may receive, within the slot, an uplink communication within the uplink frequency band.

The transmitter 1435 may transmit signals generated by other components of the device 1405. In some examples, the transmitter 1435 may be collocated with a receiver 1410 in a transceiver component. For example, the transmitter 1435 may be an example of aspects of the transceiver 1620 described with reference to FIG. 16. The transmitter 1435 may utilize a single antenna or a set of antennas.

Figure 15:
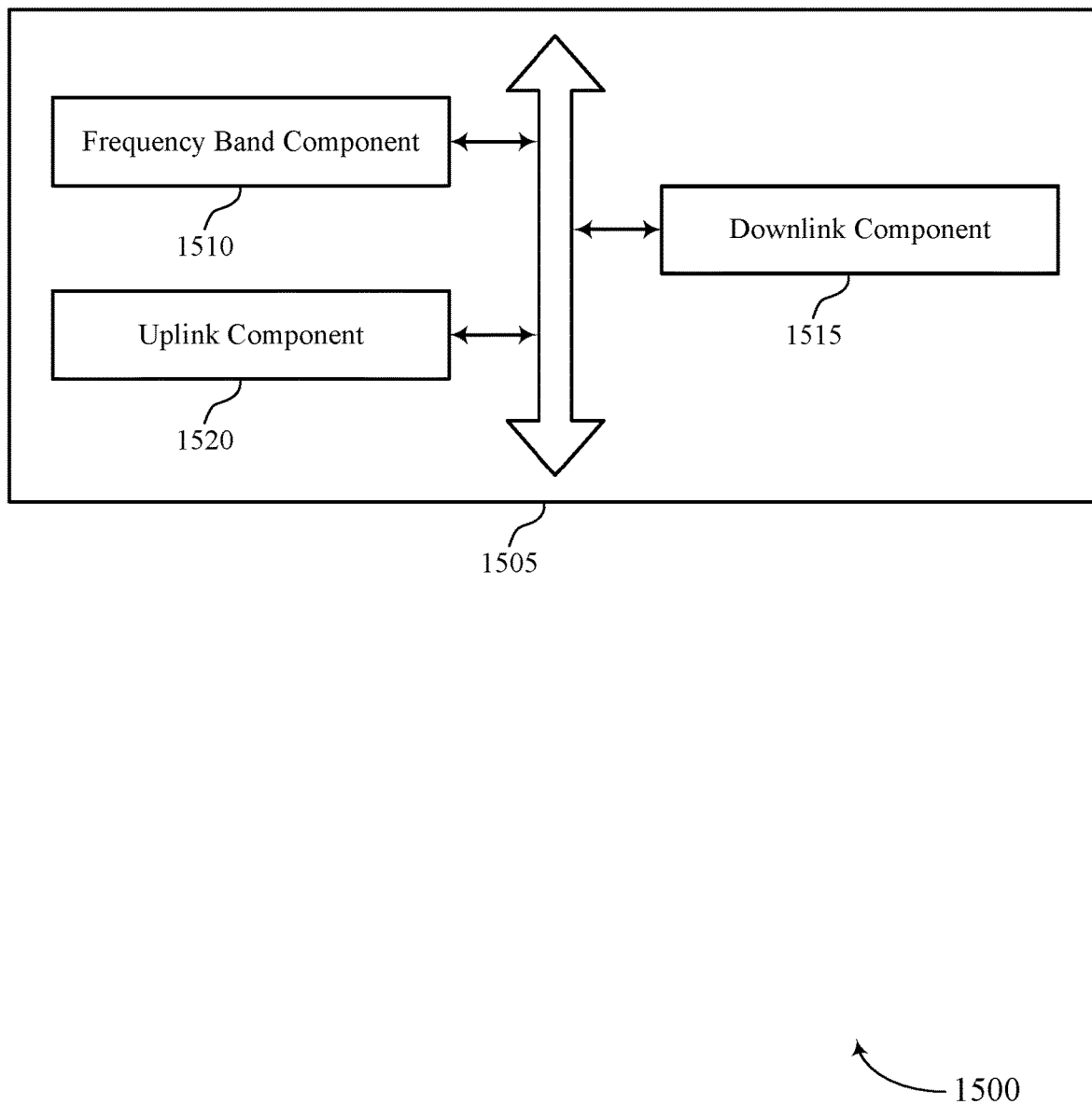
FIG. 15 shows a block diagram of a frequency band manager that supports configuration of frequency bands for full-duplex slots in accordance with aspects of the present disclosure.

FIG. 15 shows a block diagram 1500 of a frequency band manager 1505 that supports configuration of frequency bands for full-duplex slots in accordance with various aspects of the present disclosure. The frequency band manager 1505 may be an example of aspects of a frequency band manager 1315, a frequency band manager 1415, or a frequency band manager 1610 described herein. The frequency band manager 1505 may include a frequency band component 1510, a downlink component 1515, an uplink component 1520, and a guard band component 1525. Each of these components may communicate, directly or indirectly, with one another (e.g., via one or more buses).

The frequency band component 1510 may transmit an indication of a frequency band configuration for a slot, where the slot is for full-duplex communication, and where the indication of the frequency band configuration indicates a downlink frequency band for downlink communications within the slot and an uplink frequency band for uplink communications within the slot.

In some examples, the frequency band component 1510 may transmit an indication of whether the downlink frequency band is narrower in frequency than the preliminary downlink frequency band or the uplink frequency band is narrower in frequency than the preliminary uplink frequency band. In some examples, the frequency band component 1510 may transmit an indication of a size for each of the respective frequency ranges.

In some examples, the frequency band component 1510 may determine a second slot for full-duplex communication, where the second slot is subsequent to the slot and the frequency band configuration for the slot is also applicable to the second slot.

In some examples, the frequency band component 1510 may transmit an indication of a second frequency band configuration, where the frequency band configuration is associated with a first periodicity and the second frequency band configuration is associated with a second periodicity. In some cases, the first periodicity and the second periodicity are exclusive of half-duplex slots.

In some cases, the indication of the frequency band configuration includes an index for an entry of a table, the entry corresponding to a lower bound for the downlink frequency band, an upper bound for the downlink frequency band, a lower bound for the uplink frequency band, and an upper bound for the uplink frequency band.

In some cases, the entry further corresponds to a guard band between the downlink frequency band and the uplink frequency band. In some cases, the entry further corresponds to a third frequency band for one of downlink communications or uplink communications within the slot. In some cases, the index is included in a DCI message or a MAC-CE.

In some cases, the indication of the frequency band configuration includes a bitmap, each bit of the bitmap corresponding to a respective frequency range. In some cases, the downlink frequency band is indicated at least in part by a first set of one or more contiguous bits within the bitmap each having a first logic value. In some cases, the uplink frequency band is indicated at least in part by a second set of one or more contiguous bits within the bitmap each having a second logic value.

In some cases, the first set of one or more contiguous bits indicates a preliminary downlink frequency band. In some cases, the second set of one or more contiguous bits indicates a preliminary uplink frequency band.

In some cases, the downlink frequency band is narrower in frequency than the preliminary downlink frequency band by an amount. In some cases, the uplink frequency band is narrower in frequency than the preliminary uplink frequency band by the amount.

In some cases, the indication of the frequency band configuration includes a first bitmap for the downlink frequency band and a second bitmap for the uplink frequency band. In some cases, the downlink frequency band is indicated at least in part by a first set of one or more contiguous bits within the first bitmap each having a first logic value. In some cases, the uplink frequency band is indicated at least in part by a second set of one or more contiguous bits within the second bitmap each having the first logic value.

In some cases, the indication of the frequency band configuration includes a first indication of a bound for the downlink frequency band, a second indication of frequency range for the downlink frequency band, a third indication of a bound for the uplink frequency band, and a fourth indication of a frequency range for the uplink frequency band.

The downlink component 1515 may transmit, within the slot, a downlink communication within the downlink frequency band. In some examples, the downlink component 1515 may transmit, within the second slot, a second downlink communication within the downlink frequency band.

The uplink component 1520 may receive, within the slot, an uplink communication within the uplink frequency band. In some examples, the uplink component 1520 may receive, within the second slot, a second uplink communication within the uplink frequency band.

In some cases, a guard band between the downlink frequency band and the uplink frequency band spans a frequency range of at least double the amount. In some cases, a guard band between the downlink frequency band and the uplink frequency band spans a frequency range of at least the amount.

Figure 16:
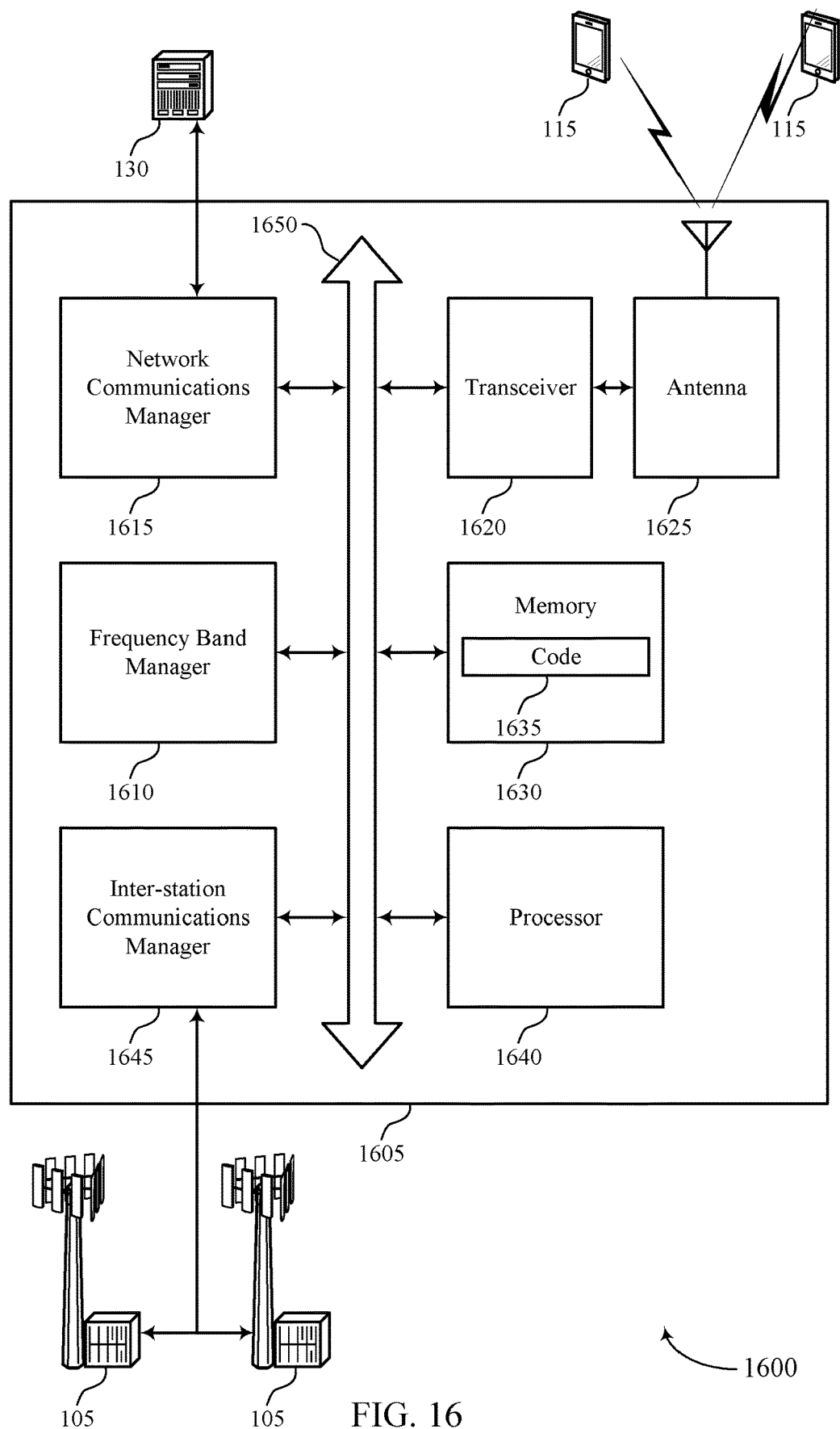
FIG. 16 shows a diagram of a system including a device that supports configuration of frequency bands for full-duplex slots in accordance with aspects of the present disclosure.

FIG. 16 shows a diagram of a system 1600 including a device 1605 that supports configuration of frequency bands for full-duplex slots in accordance with various aspects of the present disclosure. The device 1605 may be an example of or include the components of device 1305, device 1405, or a base station 105 as described herein. The device 1605 may include components for bi-directional voice and data communications including components for transmitting and receiving communications, including a frequency band manager 1610, a network communications manager 1615, a transceiver 1620, an antenna 1625, memory 1630, a processor 1640, and an inter-station communications manager 1645. These components may be in electronic communication via one or more buses (e.g., bus 1650).

The frequency band manager 1610 may transmit an indication of a frequency band configuration for a slot, where the slot is for full-duplex communication, and where the indication of the frequency band configuration indicates a downlink frequency band for downlink communications within the slot and an uplink frequency band for uplink communications within the slot, transmit, within the slot, a downlink communication within the downlink frequency band, and receive, within the slot, an uplink communication within the uplink frequency band.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting configuration of frequency bands for full-duplex slots).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
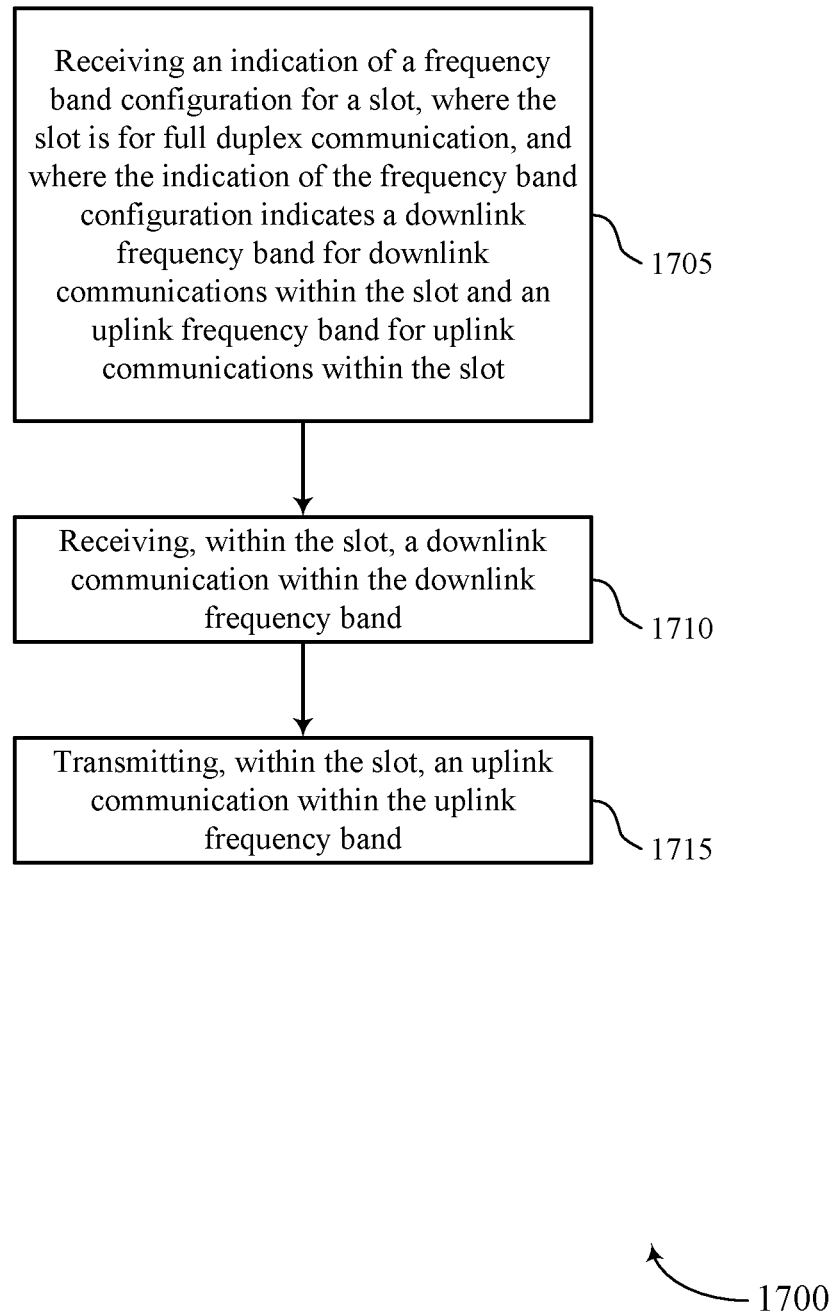
FIGS. 17 through 22 show flowcharts illustrating methods that support configuration of frequency bands for full-duplex slots in accordance with aspects of the present disclosure.

FIG. 17 shows a flowchart illustrating a method 1700 that supports configuration of frequency bands for full-duplex slots in accordance with various aspects of the present disclosure. The operations of method 1700 may be implemented by a UE or its components as described herein. For example, the operations of method 1700 may be performed by a frequency band manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive an indication of a frequency band configuration for a slot, where the slot is for full-duplex communication, and where the indication of the frequency band configuration indicates a downlink frequency band for downlink communications within the slot and an uplink frequency band for uplink communications within the slot. The operations of 1705 may be performed according to the methods described herein. In some examples, aspects of the operations of 1705 may be performed by a frequency band component as described with reference to FIGS. 9 through 12.

At 1710, the UE may receive, within the slot, a downlink communication within the downlink frequency band. The operations of 1710 may be performed according to the methods described herein. In some examples, aspects of the operations of 1710 may be performed by a downlink component as described with reference to FIGS. 9 through 12.

At 1715, the UE may transmit, within the slot, an uplink communication within the uplink frequency band. The operations of 1715 may be performed according to the methods described herein. In some examples, aspects of the operations of 1715 may be performed by an uplink component as described with reference to FIGS. 9 through 12.

Figure 18:
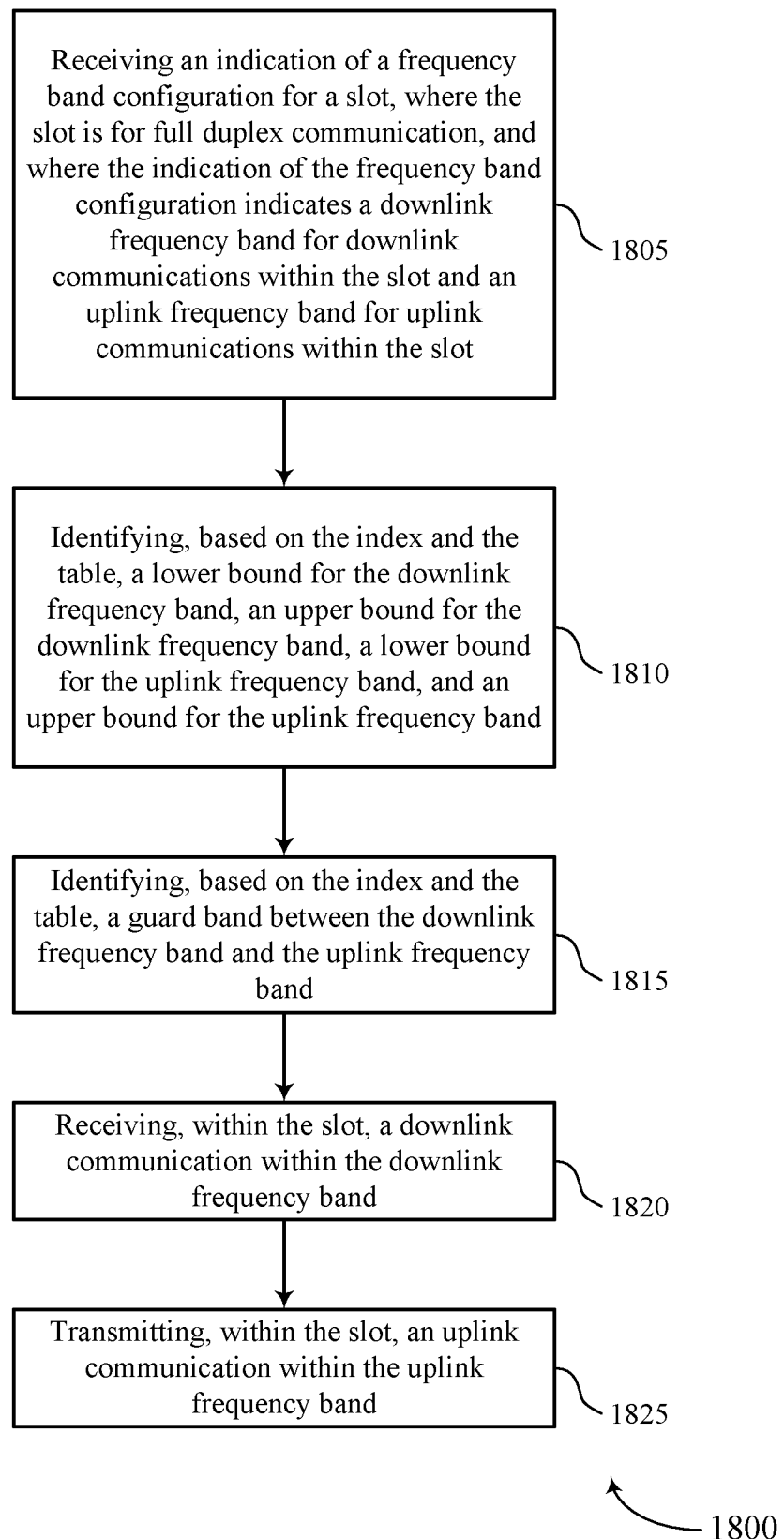

FIG. 18 shows a flowchart illustrating a method 1800 that supports configuration of frequency bands for full-duplex slots in accordance with various aspects of the present disclosure. The operations of method 1800 may be implemented by a UE or its components as described herein. For example, the operations of method 1800 may be performed by a frequency band manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive an indication of a frequency band configuration for a slot, where the slot is for full-duplex communication, and where the indication of the frequency band configuration indicates a downlink frequency band for downlink communications within the slot and an uplink frequency band for uplink communications within the slot. The operations of 1805 may be performed according to the methods described herein. In some examples, aspects of the operations of 1805 may be performed by a frequency band component as described with reference to FIGS. 9 through 12.

At 1810, the UE may identify, based on the index and the table, a lower bound for the downlink frequency band, an upper bound for the downlink frequency band, a lower bound for the uplink frequency band, and an upper bound for the uplink frequency band. The operations of 1810 may be performed according to the methods described herein. In some examples, aspects of the operations of 1810 may be performed by a frequency band component as described with reference to FIGS. 9 through 12.

At 1815, the UE may identify, based on the index and the table, a guard band between the downlink frequency band and the uplink frequency band. The operations of 1815 may be performed according to the methods described herein. In some examples, aspects of the operations of 1815 may be performed by a guard band component as described with reference to FIGS. 9 through 12.

At 1820, the UE may receive, within the slot, a downlink communication within the downlink frequency band. The operations of 1820 may be performed according to the methods described herein. In some examples, aspects of the operations of 1820 may be performed by a downlink component as described with reference to FIGS. 9 through 12.

At 1825, the UE may transmit, within the slot, an uplink communication within the uplink frequency band. The operations of 1825 may be performed according to the methods described herein. In some examples, aspects of the operations of 1825 may be performed by an uplink component as described with reference to FIGS. 9 through 12.

Figure 19:
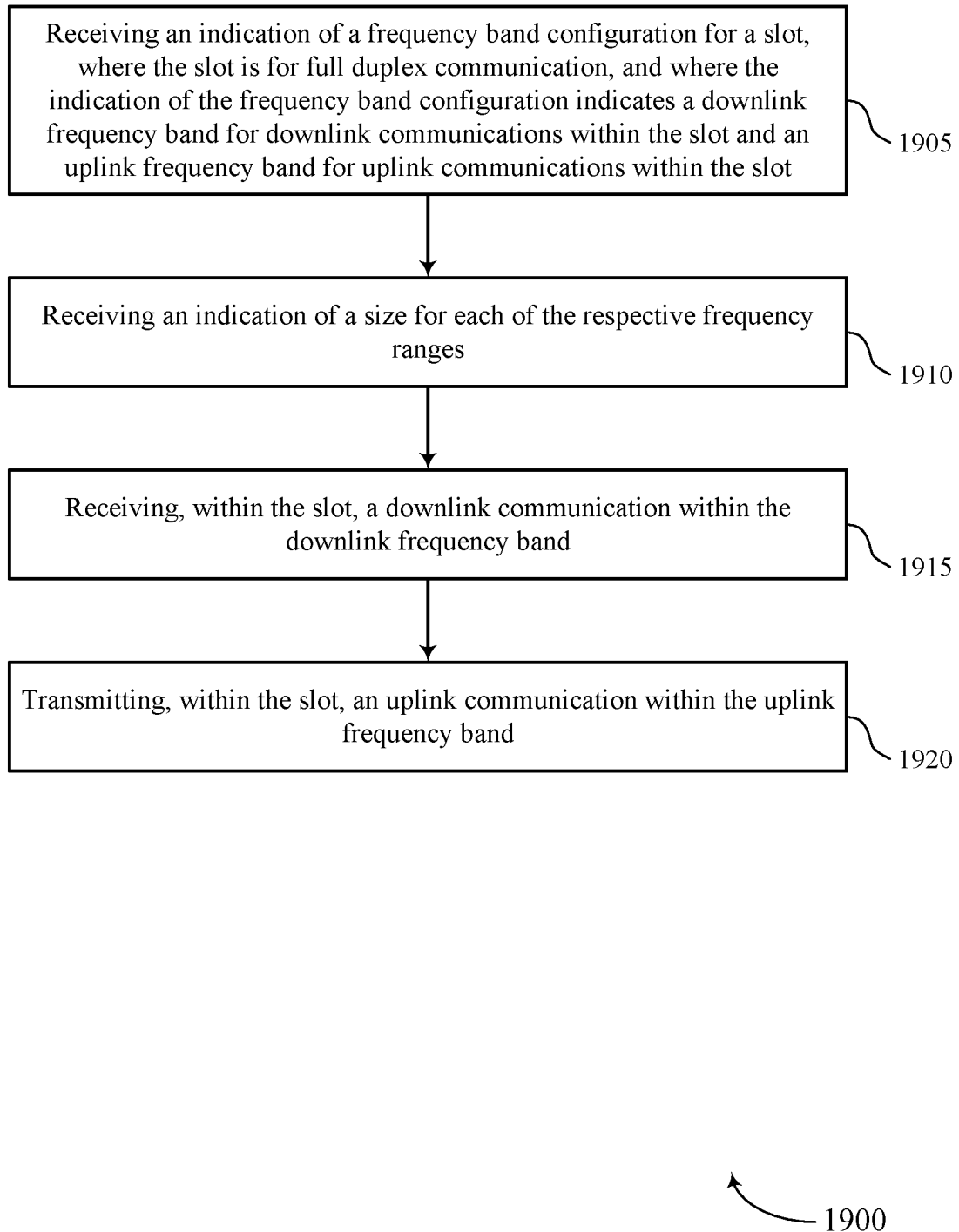

FIG. 19 shows a flowchart illustrating a method 1900 that supports configuration of frequency bands for full-duplex slots in accordance with various aspects of the present disclosure. The operations of method 1900 may be implemented by a UE or its components as described herein. For example, the operations of method 1900 may be performed by a frequency band manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may receive an indication of a frequency band configuration for a slot, where the slot is for full-duplex communication, and where the indication of the frequency band configuration indicates a downlink frequency band for downlink communications within the slot and an uplink frequency band for uplink communications within the slot.

The operations of 1905 may be performed according to the methods described herein. In some examples, aspects of the operations of 1905 may be performed by a frequency band component as described with reference to FIGS. 9 through 12.

At 1910, the UE may receive an indication of a size for each of the respective frequency ranges. In some aspects, the indication of the frequency band configuration includes a first bitmap for the downlink frequency band and a second bitmap for the uplink frequency band. In some aspects, the downlink frequency band is indicated at least in part by a first set of one or more contiguous bits within the first bitmap each having a first logic value. In some aspects, the uplink frequency band is indicated at least in part by a second set of one or more contiguous bits within the second bitmap each having the first logic value. The operations of 1910 may be performed according to the methods described herein. In some examples, aspects of the operations of 1910 may be performed by a frequency band component as described with reference to FIGS. 9 through 12.

At 1915, the UE may receive, within the slot, a downlink communication within the downlink frequency band. The operations of 1915 may be performed according to the methods described herein. In some examples, aspects of the operations of 1915 may be performed by a downlink component as described with reference to FIGS. 9 through 12.

At 1920, the UE may transmit, within the slot, an uplink communication within the uplink frequency band. The operations of 1920 may be performed according to the methods described herein. In some examples, aspects of the operations of 1920 may be performed by an uplink component as described with reference to FIGS. 9 through 12.

Figure 20:
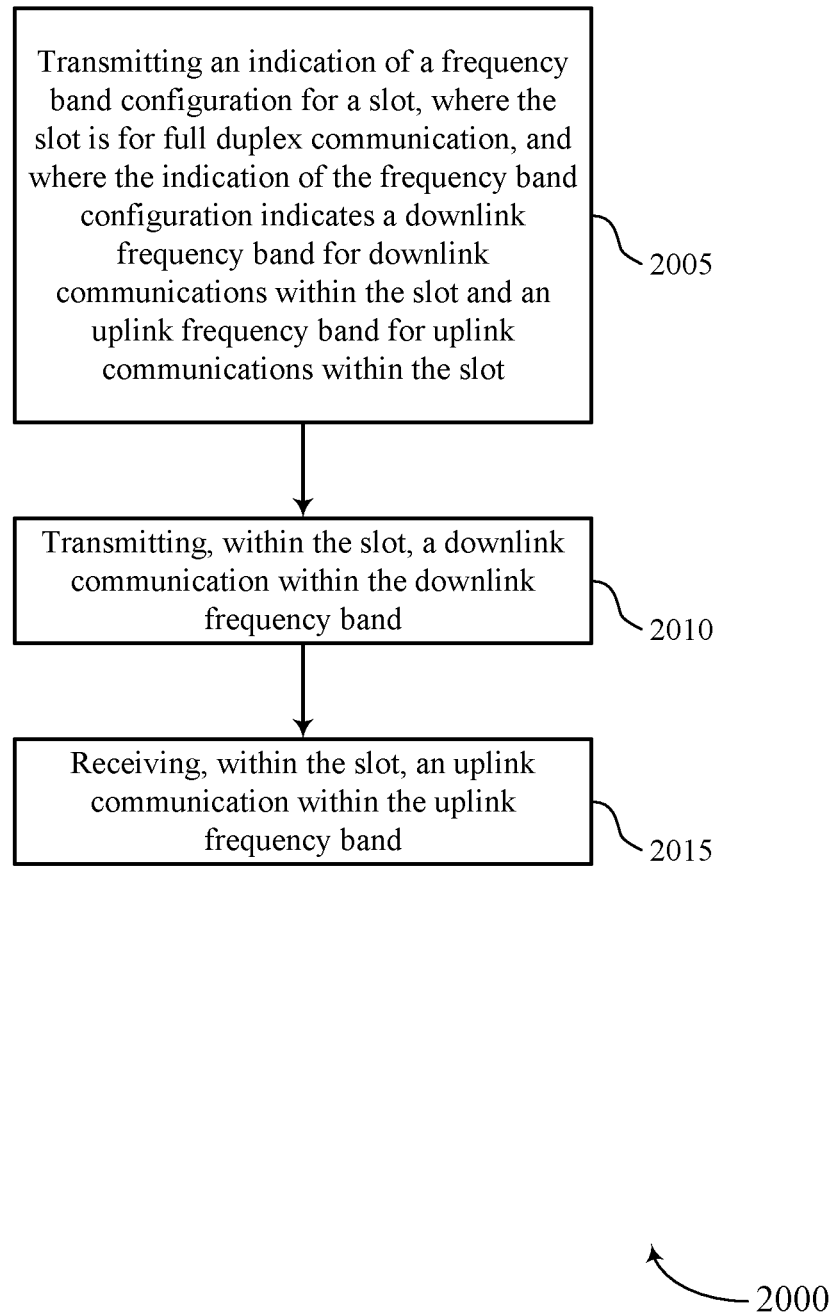

FIG. 20 shows a flowchart illustrating a method 2000 that supports configuration of frequency bands for full-duplex slots in accordance with various aspects of the present disclosure. The operations of method 2000 may be implemented by a base station 105 or its components as described herein. For example, the operations of method 2000 may be performed by a frequency band manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may transmit an indication of a frequency band configuration for a slot, where the slot is for full-duplex communication, and where the indication of the frequency band configuration indicates a downlink frequency band for downlink communications within the slot and an uplink frequency band for uplink communications within the slot. The operations of 2005 may be performed according to the methods described herein. In some examples, aspects of the operations of 2005 may be performed by a frequency band component as described with reference to FIGS. 14 through 15.

At 2010, the base station may transmit, within the slot, a downlink communication within the downlink frequency band. The operations of 2010 may be performed according to the methods described herein. In some examples, aspects of the operations of 2010 may be performed by a downlink component as described with reference to FIGS. 14 through 15.

At 2015, the base station may receive, within the slot, an uplink communication within the uplink frequency band. The operations of 2015 may be performed according to the methods described herein. In some examples, aspects of the operations of 2015 may be performed by an uplink component as described with reference to FIGS. 14 through 15.

Figure 21:
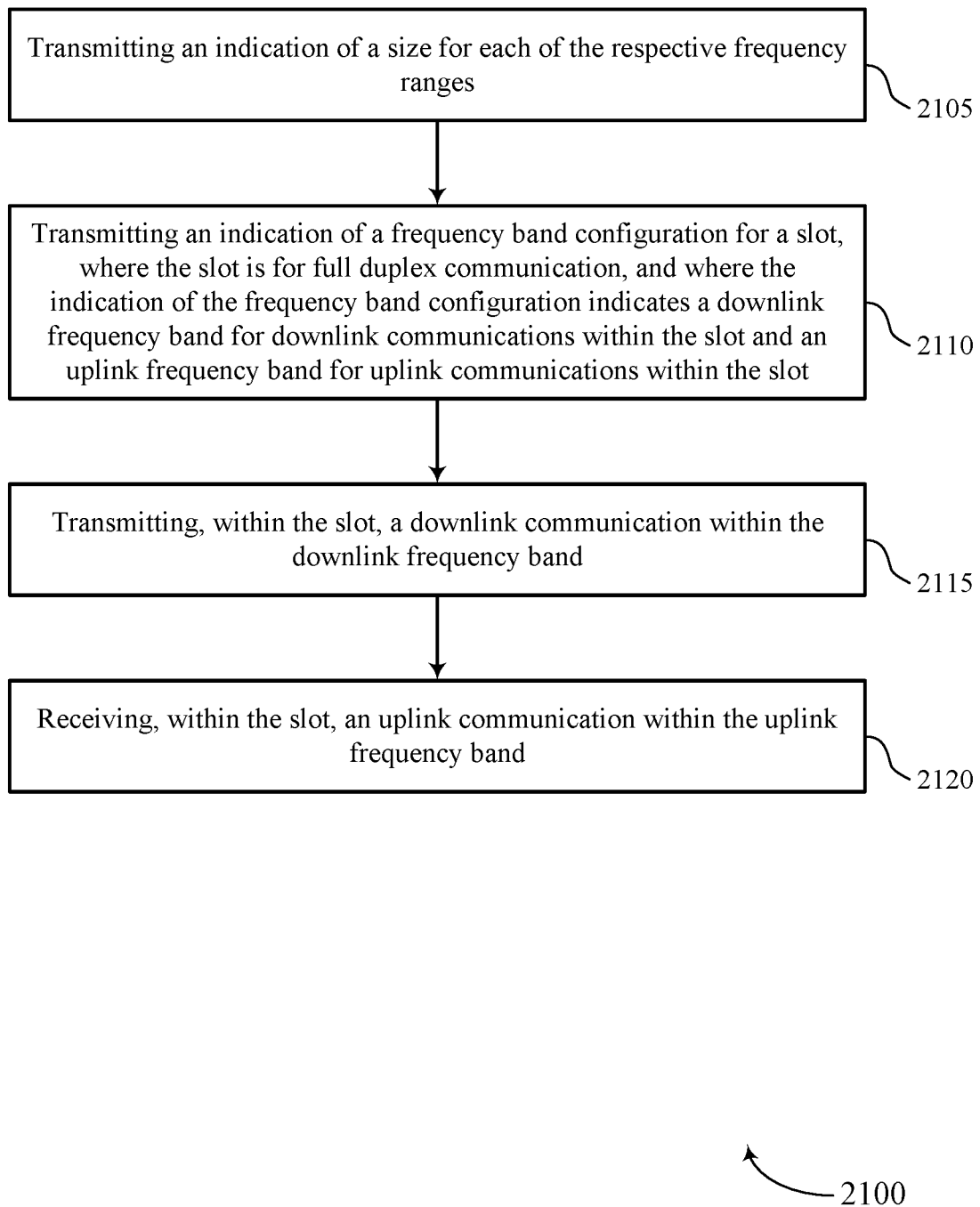

FIG. 21 shows a flowchart illustrating a method 2100 that supports configuration of frequency bands for full-duplex slots in accordance with various aspects of the present disclosure. The operations of method 2100 may be implemented by a base station 105 or its components as described herein. For example, the operations of method 2100 may be performed by a frequency band manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may transmit an indication of a size for each of the respective frequency ranges. The operations of 2105 may be performed according to the methods described herein. In some examples, aspects of the operations of 2105 may be performed by a frequency band component as described with reference to FIGS. 14 through 15.

At 2110, the base station may transmit an indication of a frequency band configuration for a slot, where the slot is for full-duplex communication, and where the indication of the frequency band configuration indicates a downlink frequency band for downlink communications within the slot and an uplink frequency band for uplink communications within the slot. In some aspects, the indication of the frequency band configuration includes a first bitmap for the downlink frequency band and a second bitmap for the uplink frequency band. In some aspects, the downlink frequency band is indicated at least in part by a first set of one or more contiguous bits within the first bitmap each having a first logic value. In some aspects, the uplink frequency band is indicated at least in part by a second set of one or more contiguous bits within the second bitmap each having the first logic value. The operations of 2110 may be performed according to the methods described herein. In some examples, aspects of the operations of 2110 may be performed by a frequency band component as described with reference to FIGS. 14 through 15.

At 2115, the base station may transmit, within the slot, a downlink communication within the downlink frequency band. The operations of 2115 may be performed according to the methods described herein. In some examples, aspects of the operations of 2115 may be performed by a downlink component as described with reference to FIGS. 14 through 15.

At 2120, the base station may receive, within the slot, an uplink communication within the uplink frequency band. The operations of 2120 may be performed according to the methods described herein. In some examples, aspects of the operations of 2120 may be performed by an uplink component as described with reference to FIGS. 14 through 15.

Figure 22:
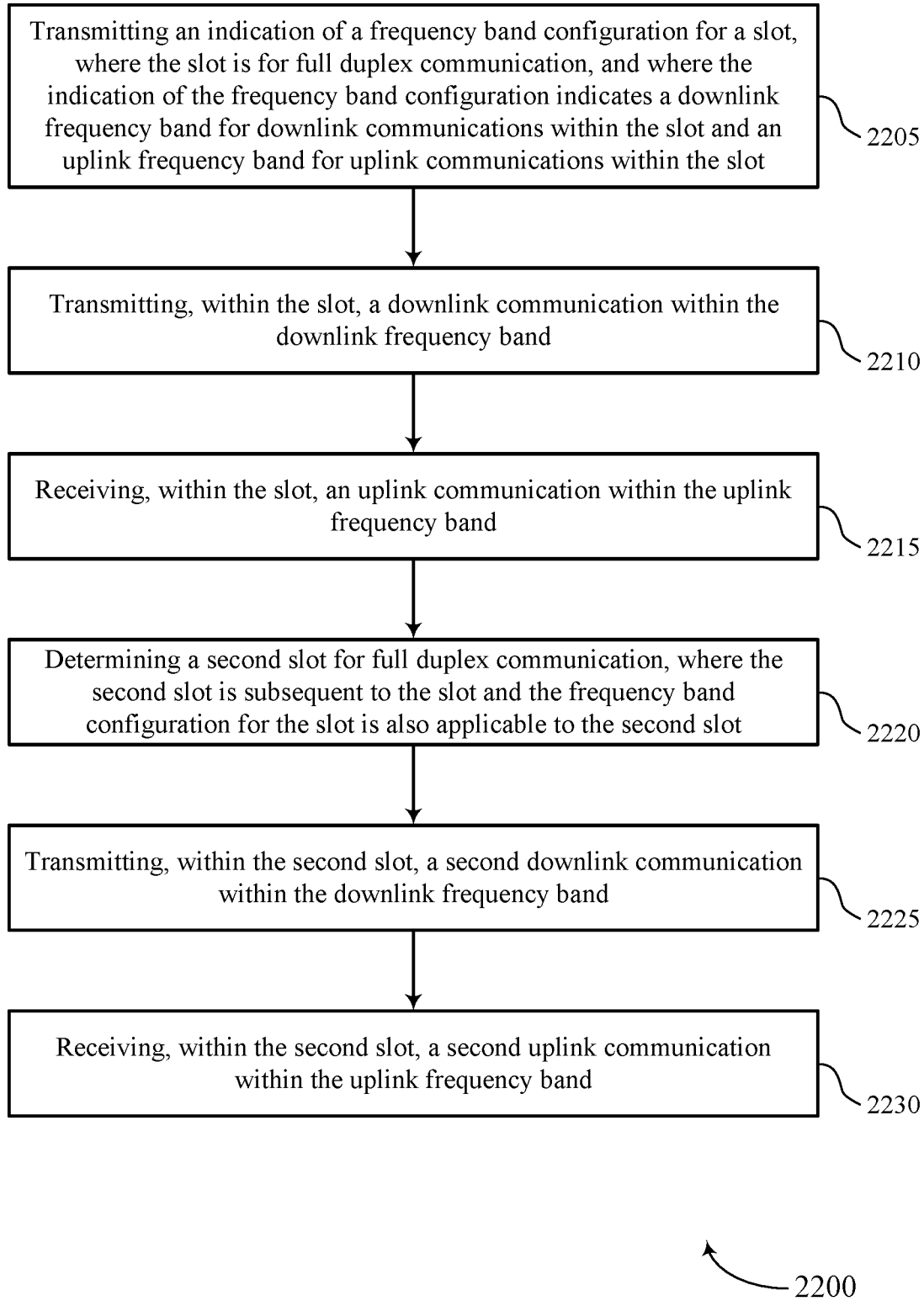

FIG. 22 shows a flowchart illustrating a method 2200 that supports configuration of frequency bands for full-duplex slots in accordance with various aspects of the present disclosure. The operations of method 2200 may be implemented by a base station 105 or its components as described herein. For example, the operations of method 2200 may be performed by a frequency band manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2205, the base station may transmit an indication of a frequency band configuration for a slot, where the slot is for full-duplex communication, and where the indication of the frequency band configuration indicates a downlink frequency band for downlink communications within the slot and an uplink frequency band for uplink communications within the slot. The operations of 2205 may be performed according to the methods described herein. In some examples, aspects of the operations of 2205 may be performed by a frequency band component as described with reference to FIGS. 14 through 15.

At 2210, the base station may transmit, within the slot, a downlink communication within the downlink frequency band. The operations of 2210 may be performed according to the methods described herein. In some examples, aspects of the operations of 2210 may be performed by a downlink component as described with reference to FIGS. 14 through 15.

At 2215, the base station may receive, within the slot, an uplink communication within the uplink frequency band. The operations of 2215 may be performed according to the methods described herein. In some examples, aspects of the operations of 2215 may be performed by an uplink component as described with reference to FIGS. 14 through 15

At 2220, the base station may determine a second slot for full-duplex communication, where the second slot is subsequent to the slot and the frequency band configuration for the slot is also applicable to the second slot. The operations of 2220 may be performed according to the methods described herein. In some examples, aspects of the operations of 2220 may be performed by a frequency band component as described with reference to FIGS. 14 through 15.

At 2225, the base station may transmit, within the second slot, a second downlink communication within the downlink frequency band. The operations of 2225 may be performed according to the methods described herein. In some examples, aspects of the operations of 2225 may be performed by a downlink component as described with reference to FIGS. 14 through 15.

At 2230, the base station may receive, within the second slot, a second uplink communication within the uplink frequency band. The operations of 2230 may be performed according to the methods described herein. In some examples, aspects of the operations of 2230 may be performed by an uplink component as described with reference to FIGS. 14 through 15.

The following provides an overview of aspects of the present disclosure:

Aspect 1: A method for wireless communication, comprising: receiving an indication of a frequency band configuration for a slot, wherein the slot is for full-duplex communication, and wherein the indication of the frequency band configuration indicates a downlink frequency band for downlink communications within the slot and an uplink frequency band for uplink communications within the slot; receiving, within the slot, a downlink communication within the downlink frequency band; and transmitting, within the slot, an uplink communication within the uplink frequency band.

Aspect 2: The method of aspect 1, wherein the indication of the frequency band configuration comprises an index for an entry of a table, the method further comprising: identifying, based at least in part on the index and the table, a lower bound for the downlink frequency band, an upper bound for the downlink frequency band, a lower bound for the uplink frequency band, and an upper bound for the uplink frequency band.

Aspect 3: The method of aspect 2, further comprising: identifying, based at least in part on the index and the table, a guard band between the downlink frequency band and the uplink frequency band, a third frequency band for one of downlink communications or uplink communications within the slot, or both.

Aspect 4: The method of aspects 2 through 3, wherein the index is included in a DCI message or a MAC-CE.

Aspect 5: The method of any of aspects 1 through 4, wherein the indication of the frequency band configuration comprises a bitmap, each bit of the bitmap corresponding to a respective frequency range; the downlink frequency band is indicated at least in part by a first set of one or more contiguous bits within the bitmap each having a first logic value; and the uplink frequency band is indicated at least in part by a second set of one or more contiguous bits with the bitmap each having a second logic value.

Aspect 6: The method of aspect 5, further comprising: determining, based at least in part on the first set of one or more contiguous bits, a preliminary downlink frequency band; determining, based at least in part on the second set of one or more contiguous bits, a preliminary uplink frequency band; reducing, by an amount, the preliminary downlink frequency band based at least in part on adjusting a bound of the preliminary downlink frequency band that is nearest in frequency to the preliminary uplink frequency band; determining the downlink frequency band based at least in part on reducing the preliminary downlink frequency band; reducing, by the amount, the preliminary uplink frequency band based at least in part on adjusting a bound of the preliminary uplink frequency band that is nearest in frequency to the preliminary downlink frequency band; and determining the uplink frequency band based at least in part on reducing the preliminary uplink frequency band.

Aspect 7: The method of aspect 6, wherein a guard band between the downlink frequency band and the uplink frequency band spans a frequency range of at least double the amount.

Aspect 8: The method of aspect 5, further comprising: determining, based at least in part on the first set of one or more contiguous bits, a preliminary downlink frequency band; determining, based at least in part on the second set of one or more contiguous bits, a preliminary uplink frequency band; reducing, by an amount, the preliminary downlink frequency band or the preliminary uplink frequency band, wherein the reducing comprises adjusting a bound of one of the preliminary downlink frequency band or the preliminary uplink frequency band; and determining the downlink frequency band or the uplink frequency band based at least in part on the reducing.

Aspect 9: The method of aspect 8, wherein a guard band between the downlink frequency band and the uplink frequency band spans a frequency range of at least the amount.

Aspect 10: The method of any of aspects 8 through 9, further comprising: receiving an indication of whether to reduce the preliminary downlink frequency band or reduce the preliminary uplink frequency band.

Aspect 11: The method of any of aspects 1 through 10, wherein the indication of the frequency band configuration comprises a first bitmap for the downlink frequency band and a second bitmap for the uplink frequency band; the downlink frequency band is indicated at least in part by a first set of one or more contiguous bits within the first bitmap each having a first logic value; and the uplink frequency band is indicated at least in part by a second set of one or more contiguous bits within the second bitmap each having the first logic value.

Aspect 12: The method of aspect 11, wherein bits of the first bitmap or the second bitmap correspond to respective frequency ranges, the method further comprising: receiving an indication of a size for each of the respective frequency ranges.

Aspect 13: The method of any of aspects 1 through 12, wherein the indication of the frequency band configuration comprises a first indication of a bound for the downlink frequency band, a second indication of a frequency range for the downlink frequency band, a third indication of a bound for the uplink frequency band, and a fourth indication of a frequency range for the uplink frequency band.

Aspect 14: The method of any of aspects 1 through 13, further comprising: identifying that a second slot is for full-duplex communication, the second slot subsequent to the slot; monitoring for an indication of a second frequency band configuration for the second slot; determining, based at least in part on the monitoring and an absence of the indication of the second frequency band configuration, that the frequency band configuration for the slot is also applicable to the second slot; receiving, within the second slot and based at least in part on the determining, a second downlink communication within the downlink frequency band; and transmitting, within the second slot and based at least in part on the determining, a second uplink communication within the uplink frequency band.

Aspect 15: The method of any of aspects 1 through 14, further comprising: receiving an indication of a second frequency band configuration, wherein the frequency band configuration is associated with a first periodicity and the second frequency band configuration is associated with a second periodicity; determining that the frequency band configuration is for the slot based at least in part on the first periodicity; and determining that the second frequency band configuration is for a second slot based at least in part on the second periodicity, the second slot subsequent to the slot.

Aspect 16: The method of aspect 15, further comprising: counting a quantity of full-duplex slots between the slot and the second slot, wherein the counting comprises skipping a half-duplex slot between the slot and the second slot.

Aspect 17: A method for wireless communication, comprising: transmitting an indication of a frequency band configuration for a slot, wherein the slot is for full-duplex communication, and wherein the indication of the frequency band configuration indicates a downlink frequency band for downlink communications within the slot and an uplink frequency band for uplink communications within the slot; transmitting, within the slot, a downlink communication within the downlink frequency band; and receiving, within the slot, an uplink communication within the uplink frequency band.

Aspect 18: The method of aspect 17, wherein the indication of the frequency band configuration comprises an index for an entry of a table, the entry corresponding to a lower bound for the downlink frequency band, an upper bound for the downlink frequency band, a lower bound for the uplink frequency band, and an upper bound for the uplink frequency band.

Aspect 19: The method of aspect 18, wherein the entry further corresponds to a guard band between the downlink frequency band and the uplink frequency band, a third frequency band for one of downlink communications or uplink communications within the slot, or both.

Aspect 20: The method of any of aspects 18 through 19, wherein the index is included in a DCI message or a MAC-CE.

Aspect 21: The method of any of aspects 17 through 20, wherein the indication of the frequency band configuration comprises a bitmap, each bit of the bitmap corresponding to a respective frequency range; the downlink frequency band is indicated at least in part by a first set of one or more contiguous bits within the bitmap each having a first logic value; and the uplink frequency band is indicated at least in part by a second set of one or more contiguous bits within the bitmap each having a second logic value.

Aspect 22: The method of aspect 21, wherein the first set of one or more contiguous bits indicates a preliminary downlink frequency band; the second set of one or more contiguous bits indicates a preliminary uplink frequency band; the downlink frequency band is narrower in frequency than the preliminary downlink frequency band by an amount; and the uplink frequency band is narrower in frequency than the preliminary uplink frequency band by the amount.

Aspect 23: The method of aspect 22, wherein a guard band between the downlink frequency band and the uplink frequency band spans a frequency range of at least double the amount.

Aspect 24: The method of aspect 21, wherein the first set of one or more contiguous bits indicates a preliminary downlink frequency band; the second set of one or more contiguous bits indicates a preliminary uplink frequency band; and the downlink frequency band is narrower in frequency than the preliminary downlink frequency band by an amount or the uplink frequency band is narrower in frequency than the preliminary uplink frequency band by the amount.

Aspect 25: The method of aspect 24, wherein a guard band between the downlink frequency band and the uplink frequency band spans a frequency range of at least the amount.

Aspect 26: The method of any of aspects 24 through 25, further comprising: transmitting an indication of whether the downlink frequency band is narrower in frequency than the preliminary downlink frequency band or the uplink frequency band is narrower in frequency than the preliminary uplink frequency band.

Aspect 27: The method of any of aspects 17 through 26, wherein the indication of the frequency band configuration comprises a first bitmap for the downlink frequency band and a second bitmap for the uplink frequency band; the downlink frequency band is indicated at least in part by a first set of one or more contiguous bits within the first bitmap each having a first logic value; and the uplink frequency band is indicated at least in part by a second set of one or more contiguous bits within the second bitmap each having the first logic value.

Aspect 28: The method of aspect 27, wherein bits of the first bitmap or the second bitmap correspond to respective frequency ranges, the method further comprising: transmitting an indication of a size for each of the respective frequency ranges.

Aspect 29: The method of any of aspects 17 through 28, wherein the indication of the frequency band configuration comprises a first indication of a bound for the downlink frequency band, a second indication of frequency range for the downlink frequency band, a third indication of a bound for the uplink frequency band, and a fourth indication of a frequency range for the uplink frequency band.

Aspect 30: The method of any of aspects 17 through 29, further comprising: determining a second slot for full-duplex communication, wherein the second slot is subsequent to the slot and the frequency band configuration for the slot is also applicable to the second slot; transmitting, within the second slot, a second downlink communication within the downlink frequency band; and receiving, within the second slot, a second uplink communication within the uplink frequency band.

Aspect 31: The method of any of aspects 17 through 30, further comprising: transmitting an indication of a second frequency band configuration, wherein: the frequency band configuration is associated with a first periodicity; and the second frequency band configuration is associated with a second periodicity.

Aspect 32: The method of aspect 31, wherein the first periodicity and the second periodicity are exclusive of half-duplex slots.

Aspect 33: An apparatus for wireless communication, comprising a processor; memory coupled with the processor; and instructions stored in the memory and executable by the processor to cause the apparatus to perform a method of any of aspects 1 through 16.

Aspect 34: An apparatus for wireless communication, comprising at least one means for performing a method of any of aspects 1 through 16.

Aspect 35: A non-transitory computer-readable medium storing code for wireless communication, the code comprising instructions executable by a processor to perform a method of any of aspects 1 through 16.

Aspect 36: An apparatus for wireless communication, comprising a processor; memory coupled with the processor; and instructions stored in the memory and executable by the processor to cause the apparatus to perform a method of any of aspects 17 through 32.

Aspect 37: An apparatus for wireless communication, comprising at least one means for performing a method of any of aspects 17 through 32.

Aspect 38: A non-transitory computer-readable medium storing code for wireless communication, the code comprising instructions executable by a processor to perform a method of any of aspects 17 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
   a memory; and
   at least one processor coupled to the memory, wherein the at least one processor is configured to:
   receive an indication of a first frequency band configuration, wherein the indication of the first frequency band configuration indicates a downlink frequency band for downlink communications and an uplink frequency band for uplink communications;
   receive, within a first slot that is for full duplex communication, a first downlink communication within the downlink frequency band in accordance with the first frequency band configuration;
   transmit, within the first slot, a first uplink communication within the uplink frequency band in accordance with the first frequency band configuration;
   receive, within a second slot that is for full duplex communication and is subsequent to the first slot, a second downlink communication within the downlink frequency band in accordance with the first frequency band configuration, wherein the first frequency band configuration is applicable to the second slot based on an absence of an indication of a second frequency band configuration; and
   transmit within the second slot, a second uplink communication within the uplink frequency band in accordance with the first frequency band configuration.

2. The apparatus of claim 1, wherein, to detect the absence of the indication of the second frequency band configuration, the at least one processor is further configured to:
   monitor, during a period after receipt of the indication of the first frequency band configuration, for the indication of the second frequency band configuration.

3. The apparatus of claim 1, wherein the at least one processor is further configured to:
   receive, after receipt of the indication of the first frequency band configuration, the indication of the second frequency band configuration, wherein the indication of the second frequency band configuration indicates a second downlink frequency band for downlink communications and a second uplink frequency band for uplink communications;
   receive, within a third slot that is for full duplex communication and is subsequent to the second slot, a third downlink communication within the second downlink frequency band in accordance with the second frequency band configuration; and
   transmit, within the third slot, a second uplink communication within the second uplink frequency band in accordance with the second frequency band configuration.

4. The apparatus of claim 1, wherein the indication of the first frequency band configuration indicates an index that corresponds to an entry of a table.

5. The apparatus of claim 1, wherein:
   the indication of the first frequency band configuration comprises a bitmap, wherein each bit of the bitmap corresponds to a respective frequency range;
   the downlink frequency band is indicated at least in part by a first set of one or more bits within the bitmap each having a first logic value; and
   the uplink frequency band is indicated at least in part by a second set of one or more bits with the bitmap each having a second logic value.

6. The apparatus of claim 5, wherein a guard band spans at least a portion of a first frequency range that corresponds to a first bit included in the first set of one or more bits and at least a portion of a second frequency range that corresponds to a second bit included in the second set of one or more bits.

7. The apparatus of claim 5, wherein a guard band spans at least a portion of a frequency range that corresponds to a bit included in the bitmap, and wherein the bit is included in the first set of one or more bits or is included in the second set of one or more bits.

8. The apparatus of claim 1, wherein the indication of the first frequency band configuration indicates a first set of one or more resource blocks corresponding to the downlink frequency band and a second set of one or more resource blocks corresponding to the uplink frequency band.

9. The apparatus of claim 1, wherein a guard band spans a frequency range that is between at least a portion of the downlink frequency band and at least a portion of the uplink frequency band.

10. The apparatus of claim 1, wherein:
the indication of the first frequency band configuration comprises a first bitmap for the downlink frequency band and a second bitmap for the uplink frequency band;
the downlink frequency band is indicated at least in part by a first set of one or more bits within the first bitmap each having a first logic value; and
the uplink frequency band is indicated at least in part by a second set of one or more bits within the second bitmap each having the first logic value.

11. The apparatus of claim 1, wherein the indication of the first frequency band configuration indicates a first bound and a first span for the downlink frequency band, and wherein the indication of the first frequency band configuration indicates a second bound and a second span for the uplink frequency band.

12. The apparatus of claim 1, wherein the first frequency band configuration is associated with a periodicity, and wherein the first frequency band configuration is applicable to the first slot and the second slot based on the periodicity.

13. An apparatus for wireless communication, comprising:
a memory; and
at least one processor coupled to the memory, wherein the at least one processor is configured to:
transmit an indication of a first frequency band configuration, wherein the indication of the first frequency band configuration indicates a downlink frequency band for downlink communications and an uplink frequency band for uplink communications;
transmit, within a first slot that is for full duplex communication, a first downlink communication within the downlink frequency band in accordance with the first frequency band configuration;
receive, within the first slot, a first uplink communication within the uplink frequency band in accordance with the first frequency band configuration;
transmit, within a second slot that is for full duplex communication and is subsequent to the first slot, a second downlink communication within the downlink frequency band in accordance with the first frequency band configuration, wherein the first frequency band configuration is applicable to the second slot based on an absence of an indication of a second frequency band configuration; and
receive within the second slot, a second uplink communication within the uplink frequency band in accordance with the first frequency band configuration.

14. The apparatus of claim 13, wherein, to cause the absence of the indication of the second frequency band configuration, the at least one processor is further configured to:
refrain from transmitting the indication of the second frequency band configuration during a period after transmission of the indication of the first frequency band configuration.

15. The apparatus of claim 13, wherein the at least one processor is further configured to:
transmit, after transmission of the indication of the first frequency band configuration, the indication of the second frequency band configuration, wherein the indication of the second frequency band configuration indicates a second downlink frequency band for downlink communications and a second uplink frequency band for uplink communications;
transmit, within a third slot that is for full duplex communication and is subsequent to the second slot, a third downlink communication within the second downlink frequency band in accordance with the second frequency band configuration; and
receive, within the third slot, a second uplink communication within the second uplink frequency band in accordance with the second frequency band configuration.

16. The apparatus of claim 13, wherein the indication of the first frequency band configuration indicates an index that corresponds to an entry of a table.

17. The apparatus of claim 13, wherein:
the indication of the first frequency band configuration comprises a bitmap, wherein each bit of the bitmap corresponds to a respective frequency range;
the downlink frequency band is indicated at least in part by a first set of one or more bits within the bitmap each having a first logic value; and
the uplink frequency band is indicated at least in part by a second set of one or more bits with the bitmap each having a second logic value.

18. The apparatus of claim 17, wherein a guard band spans at least a portion of a first frequency range that corresponds to a first bit included in the first set of one or more bits and at least a portion of a second frequency range that corresponds to a second bit included in the second set of one or more bits.

19. The apparatus of claim 17, wherein a guard band spans at least a portion of a frequency range that corresponds to a bit included in the bitmap, and wherein the bit is included in the first set of one or more bits or is included in the second set of one or more bits.

20. The apparatus of claim 13, wherein the indication of the first frequency band configuration indicates a first set of one or more resource blocks corresponding to the downlink frequency band and a second set of one or more resource blocks corresponding to the uplink frequency band.

21. The apparatus of claim 13, wherein a guard band spans a frequency range that is between at least a portion of the downlink frequency band and at least a portion of the uplink frequency band.

22. The apparatus of claim 13, wherein:
the indication of the first frequency band configuration comprises a first bitmap for the downlink frequency band and a second bitmap for the uplink frequency band;
the downlink frequency band is indicated at least in part by a first set of one or more bits within the first bitmap each having a first logic value; and
the uplink frequency band is indicated at least in part by a second set of one or more bits within the second bitmap each having the first logic value.

23. The apparatus of claim 13, wherein the indication of the first frequency band configuration indicates a first bound and a first span for the downlink frequency band, and wherein the indication of the first frequency band configuration indicates a second bound and a second span for the uplink frequency band.

24. The apparatus of claim 13, wherein the first frequency band configuration is associated with a periodicity, and wherein the first frequency band configuration is applicable to the first slot and the second slot based on the periodicity.

25. A method for wireless communication, comprising:
receiving an indication of a first frequency band configuration, wherein the indication of the first frequency band configuration indicates a downlink frequency band for downlink communications and an uplink frequency band for uplink communications;
receiving, within a first slot that is for full duplex communication, a first downlink communication within the downlink frequency band in accordance with the first frequency band configuration;
transmitting, within the first slot, a first uplink communication within the uplink frequency band in accordance with the first frequency band configuration;
receiving, within a second slot that is for full duplex communication and is subsequent to the first slot, a second downlink communication within the downlink frequency band in accordance with the first frequency band configuration, wherein the first frequency band configuration is applicable to the second slot based on an absence of an indication of a second frequency band configuration; and
transmitting within the second slot, a second uplink communication within the uplink frequency band in accordance with the first frequency band configuration.

26. The method of claim 25, further comprising:
monitoring, during a period after receipt of the indication of the first frequency band configuration, for the indication of the second frequency band configuration; and
detecting the absence of the indication of the second frequency band configuration based on the monitoring.

27. The method of claim 25, further comprising:
receiving, after receipt the indication of the first frequency band configuration, the indication of the second frequency band configuration, wherein the indication of the second frequency band configuration indicates a second downlink frequency band for downlink communications and a second uplink frequency band for uplink communications;
receiving, within a third slot that is for full duplex communication and is subsequent to the second slot, a third downlink communication within the second downlink frequency band in accordance with the second frequency band configuration; and
transmitting, within the third slot, a second uplink communication within the second uplink frequency band in accordance with the second frequency band configuration.

28. A method for wireless communication, comprising:
receiving an indication of a first frequency band configuration, wherein the indication of the first frequency band configuration indicates a downlink frequency band for downlink communications and an uplink frequency band for uplink communications;
receiving, within a first slot that is for full duplex communication, a first downlink communication within the downlink frequency band in accordance with the first frequency band configuration;
transmitting, within the first slot, a first uplink communication within the uplink frequency band in accordance with the first frequency band configuration;
receiving, within a second slot that is for full duplex communication and is subsequent to the first slot, a second downlink communication within the downlink frequency band in accordance with the first frequency band configuration, wherein the first frequency band configuration is applicable to the second slot based on an absence of an indication of a second frequency band configuration; and
transmitting within the second slot, a second uplink communication within the uplink frequency band in accordance with the first frequency band configuration.

29. The method of claim 28, further comprising:
refraining from transmitting the indication of the second frequency band configuration during a period after transmission of the indication of the first frequency band configuration, wherein the absence of the indication of the second frequency band configuration is based on the refraining.

30. The method of claim 28, further comprising:
transmitting, after transmission of the indication of the first frequency band configuration, the indication of the second frequency band configuration, wherein the indication of the second frequency band configuration indicates a second downlink frequency band for downlink communications and a second uplink frequency band for uplink communications;
transmitting, within a third slot that is for full duplex communication and is subsequent to the second slot, a third downlink communication within the second downlink frequency band in accordance with the second frequency band configuration; and
receiving, within the third slot, a second uplink communication within the second uplink frequency band in accordance with the second frequency band configuration.

* * * * *